United States Patent
Daikoku et al.

(10) Patent No.: US 9,670,996 B2
(45) Date of Patent: Jun. 6, 2017

(54) TOROIDAL CONTINUOUSLY-VARIABLE TRANSMISSION

(71) Applicant: NSK Ltd., Shinagawa-ku, Tokyo (JP)

(72) Inventors: Yuya Daikoku, Fujisawa (JP); Hiroki Nishii, Fujisawa (JP); Shouji Yokoyama, Hanyu (JP); Nobuo Goto, Fujisawa (JP); Toshirou Toyoda, Fujisawa (JP)

(73) Assignee: NSK Ltd., Tokyo (JP)

( * ) Notice: Subject to any disclaimer, the term of this patent is extended or adjusted under 35 U.S.C. 154(b) by 365 days.

(21) Appl. No.: 14/376,521

(22) PCT Filed: Feb. 4, 2013

(86) PCT No.: PCT/JP2013/052469
§ 371 (c)(1),
(2) Date: Aug. 4, 2014

(87) PCT Pub. No.: WO2013/115396
PCT Pub. Date: Aug. 8, 2013

(65) Prior Publication Data
US 2015/0024900 A1    Jan. 22, 2015

(30) Foreign Application Priority Data

Feb. 3, 2012 (JP) ................................ 2012-021944
Feb. 1, 2013 (JP) ................................ 2013-018001
(Continued)

(51) Int. Cl.
*F16H 15/38* (2006.01)
*F16H 15/40* (2006.01)
*F16H 57/04* (2010.01)

(52) U.S. Cl.
CPC .............. *F16H 15/40* (2013.01); *F16H 15/38* (2013.01); *F16H 57/049* (2013.01); *F16H 2200/00* (2013.01)

(58) Field of Classification Search
CPC .................................. F16H 15/38; F16C 17/10
(Continued)

(56) References Cited

U.S. PATENT DOCUMENTS 536,048 A * 3/1895 Schofield ................ F16C 33/08
384/296
3,984,152 A * 10/1976 Haines .................... F16C 17/18
384/280
(Continued)

FOREIGN PATENT DOCUMENTS

JP    2001-12574 A    1/2001
JP    2003-214516 A    7/2003
(Continued)

OTHER PUBLICATIONS

International Search Report dated Apr. 23, 2014 with English translation thereof {Two (2) pages}.

*Primary Examiner* — William C Joyce
(74) *Attorney, Agent, or Firm* — Crowell & Moring LLP

(57) ABSTRACT

Construction of a toroidal continuously-variable transmission is achieved that simplifies the manufacture of parts, management of parts and assembly work, is able to easily reduce costs, stabilizes speed change operations, and is processed easily. An outer ring 16b of a thrust rolling bearing is supported so as to be able to pivotally displace by engaging a concave section 24 that is provided on the outside surface of the outer ring 16b with a cylindrical convex surface 22 of a support beam 23a of a trunnion 7b. Displacement of the outer ring 16b in the axial direction of the support beam 23a is limited by engaging a concave groove 27 that is formed around the inside surface of the
(Continued)

concave section 24 in the circumferential direction around the support beam 23a with a protrusion 28 that is formed around the outer-circumferential surface of the support beam 23a.

6 Claims, 19 Drawing Sheets

(30) Foreign Application Priority Data

Feb. 1, 2013 (JP) ................ 2013-018003
Feb. 1, 2013 (JP) ................ 2013-018005

(58) Field of Classification Search
  USPC .............. 476/40, 42, 46; 384/275
  See application file for complete search history.

(56) References Cited

U.S. PATENT DOCUMENTS

| | | | |
|---|---|---|---|
| 5,398,294 A * | 3/1995 | Narkon | F16C 13/006 |
| | | | 384/280 |
| 6,332,858 B1 | 12/2001 | Mori et al. | |
| 8,496,381 B2 * | 7/2013 | Hunter | C10M 119/02 |
| | | | 384/276 |
| 2008/0009387 A1 | 1/2008 | Nishii et al. | |
| 2011/0130244 A1 | 6/2011 | Nishii et al. | |

FOREIGN PATENT DOCUMENTS

| | | |
|---|---|---|
| JP | 2004-169719 A | 6/2004 |
| JP | 2007-315595 A | 12/2007 |
| JP | 2008-25821 A | 2/2008 |
| JP | 2008-275088 A | 11/2008 |
| JP | 2011-174539 A | 9/2011 |

* cited by examiner

Fig.14 (A)
Fig.14 (B)
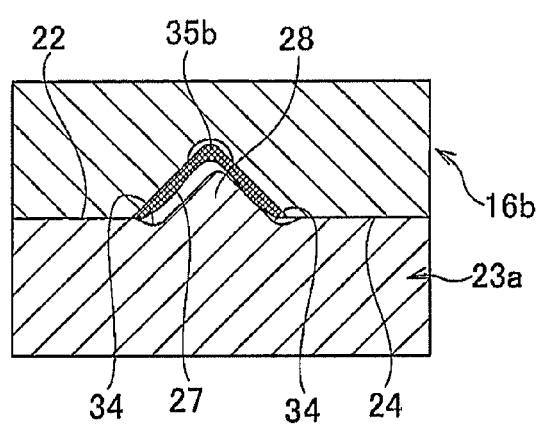
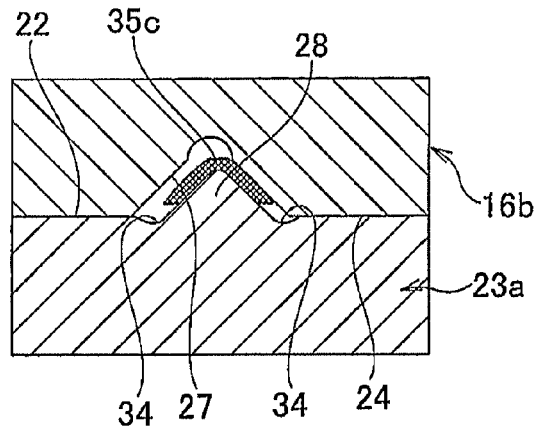

TOROIDAL CONTINUOUSLY-VARIABLE TRANSMISSION

TECHNICAL FIELD

The present invention relates to a half-toroidal type of toroidal continuously-variable transmission (CVT) that is used as an automatic transmission for vehicles such as automobiles, an automatic transmission for construction machinery, an automatic transmission for a generator that is used in aircraft and the like, and an automatic transmission for adjusting the operating speed of various kinds of industrial machinery such as pumps and the like.

BACKGROUND ART

As disclosed in JP 2003-214516 (A), JP 2007-315595 (A), JP 2008-025821 (A) and JP 2008-275088 (A) and the like, the use of a half-toroidal continuously-variable transmission as an automobile transmission is well known. Moreover, JP 2004-169719 (A) discloses construction that increases the adjustable range of the transmission ratio by combining a toroidal continuously-variable transmission and a planetary-gear mechanism.

FIG. 21 and FIG. 22 illustrate a first example of conventional construction of a toroidal continuously-variable transmission. In this first example of conventional construction, a pair of input disks 2 are supported around portions near both ends of an input rotating shaft 1 so that the inside surfaces thereof, which are toroidal curved surfaces, face each other, and so as to be able to rotate in synchronization with the input rotating shaft 1. Moreover, an output cylinder 3 is supported around the middle section of the input rotating shaft 1 so as to be able to rotate with respect to the input rotating shaft 1. An output gear 4 is fastened to the center section in the axial direction of the outer-circumferential surface of the output cylinder 3, and a pair of output disks 5 is supported around the both end sections in the axial direction of the outer-circumferential surface of the output cylinder 3 by spline engagement so as to be able to rotate synchronously with the output cylinder 3. In this state, the inside surfaces, which are toroidal curved surfaces, of the pair of output disks 5 are made to face the inside surfaces of the input disks 2.

Moreover, plural power rollers 6, the peripheral surfaces of which are spherical convex surfaces, are held between the input disks 2 and output disks 5. The power rollers 6 are supported by trunnions 7 so as to freely rotate, and the trunnions 7 are supported so as to pivotally rotate around pivot shafts 8 that are located in skewed positions with respect to the center axis of the input disks 2 and output disks 5. In other words, each trunnion 7 comprises a pair of pivot shafts 8 that are provided on both end sections in the axial direction thereof so as to be concentric with each other, and a support beam 9 that exists between the pivot shafts 8; and the pivot shafts 8 are supported by a support plate 10 by way of a radial needle bearing 11.

Moreover, each power roller 6 is supported by the inside surface of the support beam 9 of the trunnion 7 by way of a support shaft 12, of which the base-end half section and tip-end half section are eccentric with each other, and plural rolling bearings so as to be able to rotate around the tip-end half section of the support shaft 12 and so as to be able to pivotally displace a little around the base-end half section of the support shaft 12. In other words, a thrust ball bearing 13 and a thrust needle bearing 14 are provided in that order from the power roller side between the outside surface of the power roller 6 and the inside surface of the support beam 9 of the trunnion 7. The thrust ball bearing 13 is for supporting loads in the thrust direction that are applied to the power roller 6, and for allowing rotation of the power roller 6 around the tip-end half section of the support shaft 12. The thrust ball bearing 13 is constructed by providing plural balls 18 between an inner-ring raceway 15 that is formed around the outside surface of the power roller 6 and an outer-ring raceway 17 that is formed around the inside surface of an outer ring 16 so as to be able to roll. Moreover, the thrust needle bearing 14 is for supporting thrust loads that are applied from the power roller 6 to the outer ring 16 of the thrust ball bearing 13, and for allowing the outer ring 16 and the tip-end half section of the support shaft 12 to pivot around the base-end half section of the support shaft 12.

During operation of this kind of toroidal continuously-variable transmission, a drive shaft 19 rotates and drives one input disk 2 (left input disk 2 in FIG. 21) by way of a pressure apparatus 20. As a result, the pair of input disks 2 that are supported on both ends of the input rotating shaft 1 are rotated in synchronization while being pressed in a direction toward each other. The rotation of the pair of input disks 2 is transmitted to the pair of output disks 5 by way of the power rollers 6, and outputted from the output gear 4. When changing the transmission ratio between the input rotating shaft 1 and the output gear 4, hydraulic actuators 21 cause the trunnions 7 to displace in the axial direction of the pivot shafts 8. As a result, the directions of forces in the tangential direction that act at the areas of rolling contact (traction sections) between the peripheral surfaces of the power rollers 6 and the inside surfaces of the input disks 2 and output disks 5 changes, or in other words, side slipping occurs at the areas of rolling contact. As the directions of forces in the tangential direction change in this way, the trunnions 7 pivot around the pivot shafts 8, and the positions of contact between the peripheral surfaces of the power rollers 6 and the inside surfaces of the input disks 2 change. By bringing the peripheral surfaces of the power rollers 6 in rolling contact with the portions on the outside in the radial direction of the inside surfaces of the input disks 2, and with the portions near the inside in the radial direction of the inside surfaces of the output disk 5, the transmission ratio between the input rotating shaft 1 and the output gear 4 is on the accelerating side. On the other hand, by bringing the peripheral surfaces of the power rollers 6 in rolling contact with the portions on the inside in the radial direction of the inside surfaces of the input disks 2, and with the portions near the outside in the radial direction of the inside surfaces of the output disks 5, the transmission ratio between the input rotating shaft 1 and the output gear 4 is on the decelerating side.

During operation of a toroidal continuously-variable transmission such as described above, all of the members that contribute to the transmission of power, or in other words, the input disks 2, output disks 5 and power rollers 6 elastically deform due to the pressure force generated by the pressure apparatus 20. Then, as these members elastically deform, the input disks 2 and output disks 5 displace in the axial direction. Moreover, the pressure force that is generated by the pressure apparatus 20 becomes larger the larger the torque is that is transmitted by the toroidal continuously-variable transmission, and as the pressure force becomes larger, the amount of elastic deformation of these members 2, 5, 6 also increases. Therefore, in order to properly maintain a state of contact between the inside surfaces of the input disks 2 and output disks 5 and the peripheral surfaces of the power rollers 6 regardless of change in the torque that is transmitted by the toroidal continuously-variable transmission, a mechanism that causes the power rollers 6 to displace with respect to the trunnions 7 in the axial direction of the input disks 2 and output disks 5 becomes necessary.

In the case of the first example of conventional construction, the power rollers 6 are caused to displace in the axial direction of the input disks 2 and output disks 5 by causing the tip-end half section of the support shafts 12 that support the power rollers 6 to pivotally displace around the base-end half section of the support shafts 12. However, the construction for causing the power rollers 6 to displace in the axial direction of the input disks 2 and output disks 5 becomes complex, so production and management of parts, and the assembly work all become troublesome and an increase in cost cannot be avoided.

On the other hand, JP 20030214516 (A) discloses construction such as illustrated in FIG. 23 to FIG. 28. A feature of this second example of conventional construction is the portion for supporting the power rollers 6a by the trunnions 7a so as to be able to displace in the axial direction of the input disks 2 and output disks 5 (see FIG. 21). The trunnions 7a of this second example of conventional construction comprise a pair of pivot shafts 8a, 8b that are provided on both ends so as to be concentric with each other, and a support beam section 23 that is located between the pivot shafts 8a, 8b, with at least the side surface on the inside (top side in FIG. 24, FIG. 27 and FIG. 28) in the radial direction (up-down direction in FIG. 24, FIG. 27 and FIG. 28) of the input disks 2 and output disks 5 (see FIG. 21) being a cylindrical convex surface 22. The pivot shafts 8a, 8b are supported by a support plate 10 (see FIG. 22) by way of a radial needle bearing 11a so as to be able to pivot and to displace in the axial direction.

As illustrated in FIG. 24 and FIG. 27, the center axis α of the cylindrical convex surface 22 is parallel to the center axis β of the pivot shafts 8a, 8b and is located further on the outside (bottom side in FIG. 24, FIG. 27 and FIG. 28) in the radial direction of the input disks 2 and output disks 5. Moreover, a partial cylindrical surface shaped concave section 24 is provided on the outside surface of the outer ring 16a of a thrust ball bearing 13a that is provided between the support beam section 23 and the outside surface of the power roller 6a so as to cross the outside surface of the outer ring 16a in the radial direction. By fitting the concave section 24 with the cylindrical convex surface 22 of the support beam section 23, the outer ring 16a is supported by the trunnion 7a so as to be able to pivotally displace in the axial direction of the input disk 2 and output disk 5.

A support shaft 12a is fixed to the center section of the inside surface of the outer ring 16a so as to be integrally provided with the outer ring 16a, and the power roller 6a is supported around the support shaft 12a by way of a radial needle bearing 25 so as to rotate freely. Furthermore, a pair of stepped surfaces 26 that face each other are provided in the connecting section between both ends of the support beam 23 and the pair of pivot shafts 8a, 8b of the inside surface of the trunnion 7a. By having the pair of stepped surfaces 29 come in contact with or closely facing the outer-circumferential surface of the outer ring 16a of the thrust ball bearing 13, the traction force that is applied from the power roller 6a to the outer ring 16a can be supported by one of the stepped surfaces 26.

This second example of conventional construction causes the power rollers 6a to displace in the axial direction of the input disks 2 and output disks 5, and regardless of change in the amount of elastic deformation of these members 2, 5, 6a, construction that properly maintains the state of contact between the peripheral surfaces of the power rollers 6a and the inside surfaces of the input disks 2 and output disks 5 is achieved simply and at low cost.

In other words, during operation of the toroidal continuously-variable transmission, when it is necessary to cause the power rollers 6a to displace in the axial direction of the input disks 2 and output disks 5 due to elastic deformation of the members 2, 5, 6a, the outer rings 16a of the thrust ball bearings 13a that support the power rollers 6a so as to freely rotate, pivotally displace around the center axes α of the cylindrical convex surfaces 22 while there is sliding of contact surfaces between the concave sections 24 of the outer ring 16a and the cylindrical convex surfaces 22 of the support beams 23. Due to the pivotal displacement of the outer rings 16a, the portions of the peripheral surfaces of the power rollers 6a that come in rolling contact with one of the side surfaces in the axial direction of the input disks 2 and output disks 5 displace in the axial direction of these disks 2, 5, and the state of contact between the peripheral surfaces of the power rollers 6a and the inside surfaces of these disks 2, 5 is properly maintained.

The center axis α of the cylindrical convex surface 22 is located further on the outside in the radial direction of the input disk 2 and output disk 5 than the center axis β of the pivot shafts 8a, 8b, which is the pivot center of the trunnion 7a during a speed change operation. Therefore, the radius of pivotal displacement around the center axis α of the cylindrical convex surface 22 is greater than the pivot radius during a speed change operation, so there is little effect on fluctuation of the transmission ratio between the input disk 2 and output disk 5, which can be ignored or remains within a range that can be easily corrected.

However, in this second example of conventional construction as well, from the aspect of stabilizing a speed change operation, there is room for improvement. In other words, in order to smoothly perform the pivotal displacement of the outer ring 16a around the support beam 23, the space "D" between the pair of stepped surfaces 26 that are provided on both ends of the support beam 23 must be made a little larger than the outer diameter "d" of the outer ring 16a (D>d). Therefore, the outer ring 16a and the power roller 6a that is supported concentric with the outer ring 16a are able to displace in the axial direction of the support beam 23 by the amount of the difference between the space "D" between the stepped surfaces 26 and the outer diameter "d" of the outer ring 16a (D−d).

On the other hand, during operation of a vehicle in which a toroidal continuously-variable transmission is installed, a force called "2Ft" that is well known in the technical field of toroidal continuously-variable transmissions is applied to the power rollers 6a from the input disks 2 and output disks 5 in opposite directions between at acceleration and at deceleration (during engine braking). Due to this force "2Ft", the power rollers 6a displace in the axial direction of the support beams 23 together with the outer rings 16a. The direction of displacement of the support beams 23 is the same as the direction of displacement of the trunnions 7 (see FIG. 22) due to actuators 21, and even when the amount of displacement is about 0.1 mm, there is a possibility that a speed change operation will start. When a speed change operation starts due to such a cause, the speed change operation is not directly related to the operation of the vehicle, and even when correction is performed, a feeling that something is wrong is given to the driver. Particularly, when a speed change that is not intended by the driver is performed in a state in which the torque transmitted by the toroidal continuously-variable transmission is low, it is easy for the feeling given to the driver that something is wrong to become large.

In order to suppress the generation of speed change operations such as this that are not directly related to the vehicle operation, it is possible to make the difference between the distance "D" between the pair of stepped surfaces 26 and the outer diameter "d" of the outer ring 16a (D−d) minimized, for example, tens of μm. However, during operation of a half-toroidal type of toroidal continuously-variable transmission, due to the thrust load that is applied from the traction area to the support beam 23 by way of the power roller 6a and outer ring 16a, the trunnion 7a, as exaggeratedly illustrated in FIG. 29, elastically deforms in a direction such that the side where the outer ring 16a is located becomes concave. As a result of this elastic deformation, the space between the pair of stepped surfaces 26 that are provided for each trunnion 7a is reduced. In such a state as well, in order that the space "D" between the pair of stepped surfaces 26 does not become equal to or less than the outer diameter "d" of the outer ring 16a, it is necessary to maintain a certain amount of difference between the space "D" and outer diameter "d" when the trunnion 7a is in the normal state with no elastic deformation. As a result, during operation at low torque when it is particularly easy for a feeling that something is wrong to occur, it becomes easy for a speed change operation that is not directly related to the vehicle operation to occur. Especially, as disclosed in JP 2004-169719 (A), in the case of a continuously-variable transmission that is a combination of a toroidal continuously-variable transmission, a planetary-gear transmission, and clutch apparatus, and that switches between a low-speed mode and high-speed mode by way of the clutch apparatus, as the mode is switched while remaining in the acceleration state, the direction of the torque that passes through the toroidal continuously-variable transmission is reversed. Therefore, a speed change operation such as described above that is not directly related to the vehicle operation occurs, and that operation gives the driver a feeling that something is wrong.

JP 2008-025821 (A) discloses construction for supporting the force "2Ft" by fitting an anchor piece that is fastened to part of a cylindrical convex surface that is provided on a support beam side together with an anchor groove that is formed in the inside surface of a concave section on an outer ring side. With this construction, fastening the anchor piece to the support beam and supporting the anchor piece so as to be able to maintain the strength and rigidity to be able to support the force "2Ft" is difficult, as well as it becomes difficult to lower cost and maintain sufficient reliability. Moreover, construction is also disclosed in which the force "2Ft" is supported by plural balls that are located between rolling grooves having arc shaped cross sections that are formed in the portions of a cylindrical convex surface and a concave section that are aligned with each other. In this construction, as the force "2Ft" becomes larger and the surface pressure at the areas of rolling contact between the rolling surfaces of the balls and the rolling grooves increases, there is a possibility that indentations will be formed in the inner surfaces of the rolling grooves, and that vibration will occur when the inner ring pivotally displaces with respect to the trunnion. Furthermore, construction is also disclosed in which the force "2Ft" is supported by fitting together a protrusion that is formed around the outer-circumferential surface of the support beam such that surfaces on both sides in the axial direction thereof are parallel to each other, with a concave groove that is formed around the inside surface of a concave section on the outer-ring side. In this construction, during polishing in order to precisely finish the space between the side surfaces of the protrusion in order to reduce gaps in the section where the protrusion fits with the concave groove, it is easy for damage to occur on the side surfaces due to polishing burn. In other words, the polishing process is performed by pressing a rotating grindstone against the side surfaces of the protrusion. When doing this, the side surfaces of the protrusion, which are the surfaces to be processed, are parallel to each other, or in other words, these side surfaces are perpendicular to the axis of rotation of the grindstone, so it is easy polishing burn to occur due to an increase in temperature of these side surfaces. Moreover, the axial direction of the axis of rotation of the grindstone and the direction the grindstone is pressed are parallel, so it is not possible to polish the side surfaces of the protrusion and the cylindrical convex surface at the same time, so the processing efficiency is bad, and the manufacturing cost of the overall trunnion increases.

RELATED LITERATURE

Patent Literature

[Patent Literature 1] JP 2003-214516 (A)
[Patent Literature 2] JP 2007-315595 (A)
[Patent Literature 3] JP 2008-025821 (A)
[Patent Literature 4] JP 2008-275088 (A)
[Patent Literature 5] JP 2004-169719 (A)

SUMMARY OF INVENTION

Problem to be Solved by Invention

Taking into consideration the situation described above, the object of the present invention is to provide a toroidal continuously-variable transmission having construction for which the manufacture of parts, the management of parts, and assembly work are all simple, the cost is low, speed change operation is stable, and processing is simple.

Means for Solving Problems

The toroidal continuously-variable transmission of the present invention comprises: at least one pair of disks each having an axially one side surface which is a toroidal curved surface and concentrically supported such that relative rotation is possible in a state that the axially one side surfaces thereof are made to face each other; and plural combinations of a trunnion, a power roller and a thrust rolling bearing that are provided at plural locations in the circumferential direction between the axially one side surfaces of the disks.

In each combination of the trunnion, power roller and thrust rolling bearing, the trunnion comprises: a pair of pivot shafts provided on both end sections of the trunnion so as to be concentric with each other, and so as to be located at positions in the axial direction that are skewed with respect to the center axis of the disks; and a support beam located between the pivot shafts and having an inside surface in the radial direction of the disks which is a cylindrical convex surface having a center axis that is parallel to the center axis of the pivot shafts and that is located further on the outside in the radial direction of the disks than the center axis of the pivot shafts. The trunnion is able to pivotally displace freely around the pivot shafts.

The power roller is supported by the inside surface of the trunnion by way of the thrust rolling bearing so as to be able to rotate freely, and the peripheral surface thereof, which is a spherical convex surface, comes in contact with the axially one side surfaces of the disks.

The thrust rolling bearing is provided between the support beam of the trunnion and the outside surface of the power roller, and comprises: an outer ring that is provided on the support-beam side; and plural rolling bodies that are provided between an outer-ring raceway that is provided around an inside surface of the outer ring, and an inner-ring raceway that is provided around an outside surface of the power roller.

The outer ring has a concave section provided on the outside surface thereof and is supported by the trunnion so as to be able to pivotally displace by engaging the concave section with the cylindrical convex surface of the support beam. The concave section is provided with a concave groove, which is a tapered groove having a wide opening and a narrow bottom, that is formed on the inner surface thereof and the cylindrical convex surface is provided with a tapered protrusion having a wide base section and a narrow tip-end section that is formed in the circumferential direction around the support beam, and displacement of the outer ring in the axial direction of the support beam is restricted by engaging the concave groove with the tapered protrusion.

Preferably, the cross-sectional shape of at least one of the inside surfaces of the concave groove and the outside surfaces of the protrusion is a partial arc that is curved in a direction so as to protrude toward the other of the inside surfaces and the outside surfaces.

In this case, preferably the radius of curvature of the partial arc is 2 mm or more, and more preferably is 3 mm or more, and most preferably is 5 mm or more.

Alternatively, the cross-sectional shape of one of the inside surfaces of the concave groove and the outside surfaces of the protrusion can be a partial arc that is curved in a direction so as to protrude toward the other of the inside surfaces and the outside surfaces, and the other of the inside surfaces and the outside surfaces can be a partial arc surface that is curved along the one of the inside surfaces and the outside surfaces in a direction going away from the one of the inside surfaces and the outside surfaces.

Preferably, the concave section and the concave groove are processed simultaneously, and the cylindrical convex surface and the protrusion are processed simultaneously.

Preferably, in a state where the power roller does not transmit torque and there is no elastic deformation of the support beam and outer ring, the width of the concave groove is larger than the width of the protrusion in portions where positions in the radial direction of the support beam match each other, and looseness that is the amount that the outer ring is able to displace in the axial direction of the support beam with respect to the support beam (difference in the widths of the portions where the positions in the radial direction match each other) is 0.100 mm or less, and more preferably is 0.050 mm or less.

In order to keep the looseness to 0.100 mm or less, construction is possible in which a spacer that is formed into a partial arc shape that corresponds to the at least one of the inside surfaces of the concave groove and the outside surfaces of the protrusion is mounted to the at least one of the inside surfaces and the outside surfaces.

Moreover, preferably, relief concave sections that are recessed in the radial direction are formed in portions on the outer-circumferential surface of the support beam that are located on both sides of the protrusion in the axial direction of the support beam, and a sealing material having elasticity is filled between the bottom surfaces of the relief concave sections and the inner-circumferential surface of the concave section.

In other words, the toroidal continuously-variable transmission of the present invention comprises at least one pair of disks, and plural combinations of a trunnion, a power roller and a thrust rolling bearing, and in each of these combinations, by a concave section that is provided on the outside surface of the outer ring of the thrust rolling bearing engaging with the cylindrical convex surface of the support beam, the outer ring is supported by the trunnion so as to be able to pivotally displace in the axial direction of disks; and the construction of the portion provided for restricting displacement of the outer ring of the thrust rolling bearing in the axial direction of the support beam is constructed so that the larger the torque transmitted by the power roller becomes, the larger the thrust load applied to the outer ring from the power roller becomes, and the larger the amount of elastic deformation of the support beam becomes, the amount that the support beam allows the outer ring to displace in the axial direction of the disks is increased, and is shaped so as to be able to be ground by a single formed grindstone.

Effect of Invention

With the present invention, construction of a toroidal continuously-variable transmission is achieved that simplifies the manufacture of parts, management of parts, and assembly work, is able to easily reduce costs, stabilizes speed change operations, and is processed easily.

In the present invention, stabilizing the speed change operation is made possible by preventing displacement of the outer ring in the axial direction of the support beam with respect to the trunnion by the concave groove that is provided in the circumferential direction around the inside surface of the concave section of the outer ring engaging with the protrusion that is provided in the circumferential direction around the outer-circumferential surface of the support beam of the trunnion. Particularly, gaps in the axial direction of the support beam in the area of engagement between the concave groove, which is a tapered groove having a wide opening and a narrow bottom, and the protrusion, which is a tapered protrusion having a wide base section and a narrow tip-end section, have a tendency to become larger, the larger the torque transmitted by the power roller becomes, the larger the thrust load applied to the outer ring from the power roller becomes, and the larger the amount of elastic deformation of the support beam becomes. Therefore, gaps in the axial direction in the area of engagement between the concave groove and protrusion in a state in which the thrust load is zero or very small, and where there is no elastic deformation of the support beam are made as minimized as possible with processing still being possible. Therefore, the occurrence of a speed change operation that is not directly related to the operation of the driver during low-torque operation, in which it is particularly easy for a feeling that something is wrong to become large, is prevented.

In the present invention, simplifying processing is accomplished by making the concave groove that is provided in the outer ring a tapered groove having a wide opening and a narrow bottom, and making the protrusion that is provided in the trunnion a tapered protrusion having a wide base section and a narrow tip-end section. With this kind of tapered groove and tapered protrusion, grinding burn of the side surfaces during grinding in order to improve the precision of the width dimensions does not easily occur. In other words, when processing the side surfaces, the side surfaces are inclined with respect to direction of rotation of the grindstone, and the angle between the direction of rotation of the grindstone and the side surfaces is an acute angle, so it becomes difficult for the temperature of the side surfaces to rise, and thus the occurrence of grinding burn is prevented. Moreover, it is possible to perform grinding of both the side surfaces and cylindrical convex surface of the support beam at the same time, so when compared with the conventional construction, processing efficiency is increased.

BRIEF DESCRIPTION OF DRAWINGS

FIG. 14A and FIG. 14B are views similar to FIG. 10 and illustrate two different examples of the shape of the spacer applied in the second example.

FIG. 15A is a partial cross-sectional view of an outer ring and trunnion of a third example of an embodiment of the present invention, and illustrates the state after the sealing material has been filled in; and FIG. 15B is another partial cross-sectional view thereof and illustrates the state before the sealing material has been filled in.

MODES FOR CARRYING OUT INVENTION

First Example

FIG. 1 to FIG. 8 illustrate a first example of an embodiment of the present invention. A feature of this example is construction that, in order to stabilize a speed change operation, supports an outer ring 16b of a thrust ball bearing 13a by a support beam 23a of a trunnion 7b so as to be able to pivotally displace with respect to the support beam 23a, while at the same time keeps the outer ring 16b from displacing in the axial direction of the support beam 23a. The construction and functions of the other parts are the same as in the second example of conventional construction.

Figure 21:
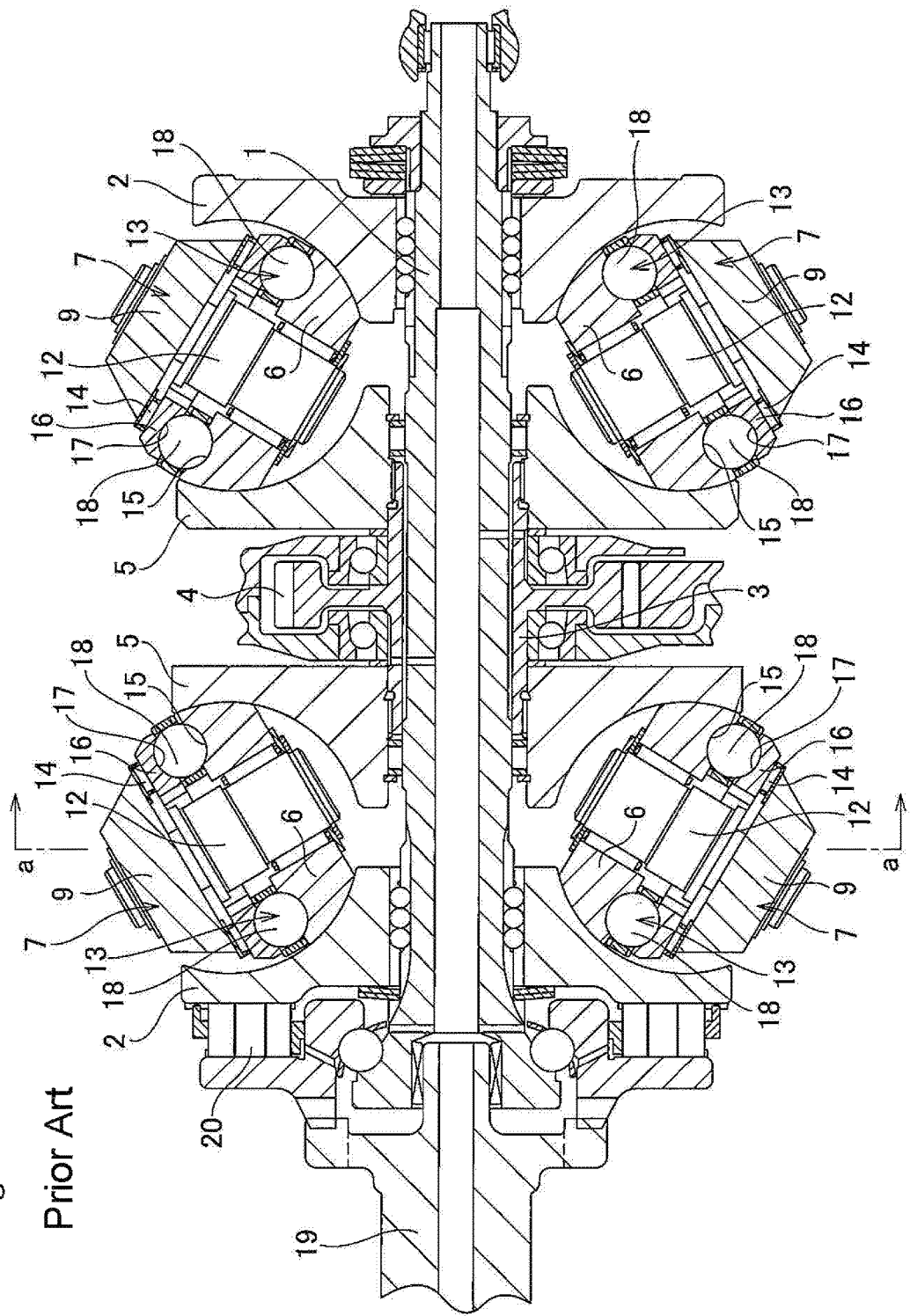
FIG. 21 is a cross-sectional view illustrating a first example of conventional construction.
Figure 27:
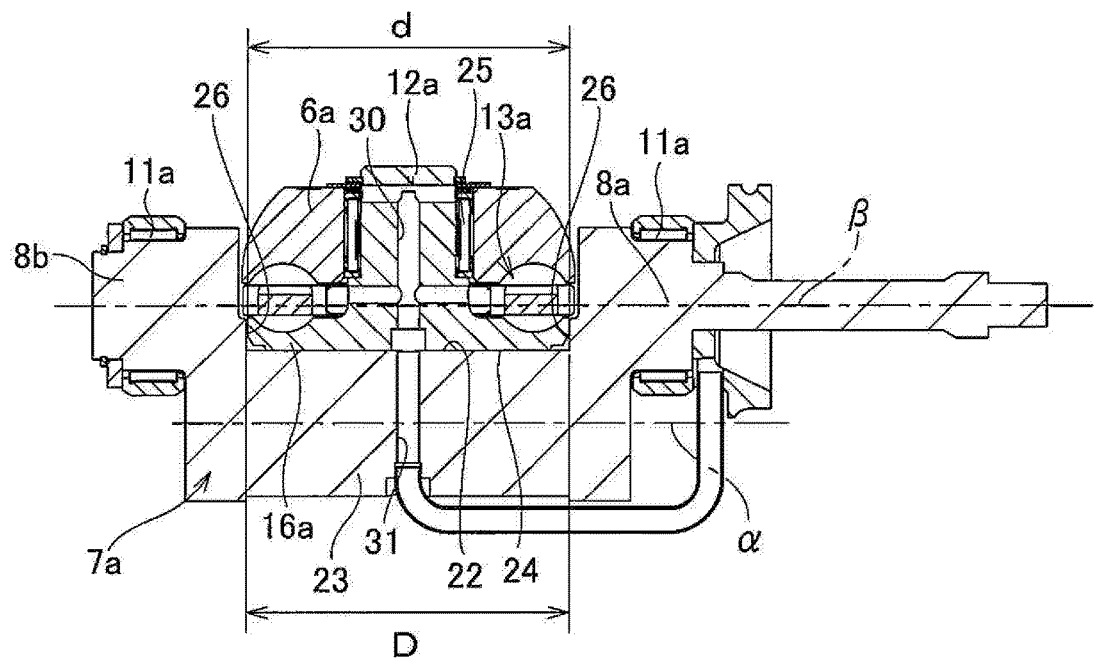
FIG. 27 is a cross-sectional view of section b-b in FIG. 25.
Figure 28:
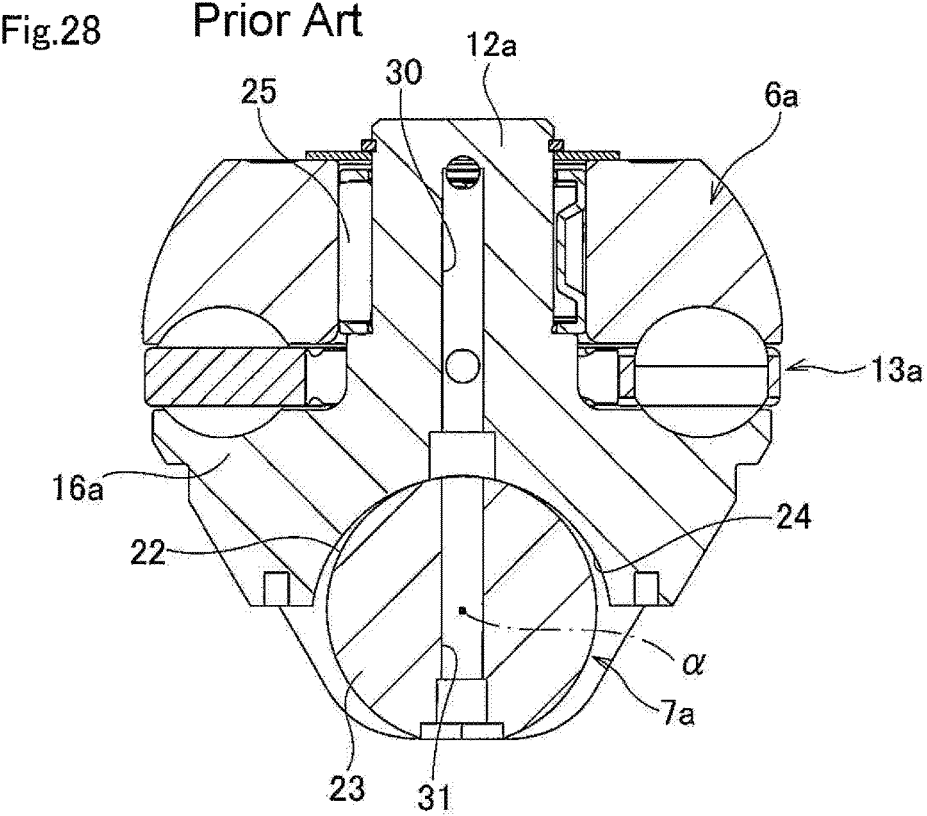
FIG. 28 is a cross-sectional view of section c-c in FIG. 24.
Figure 29:
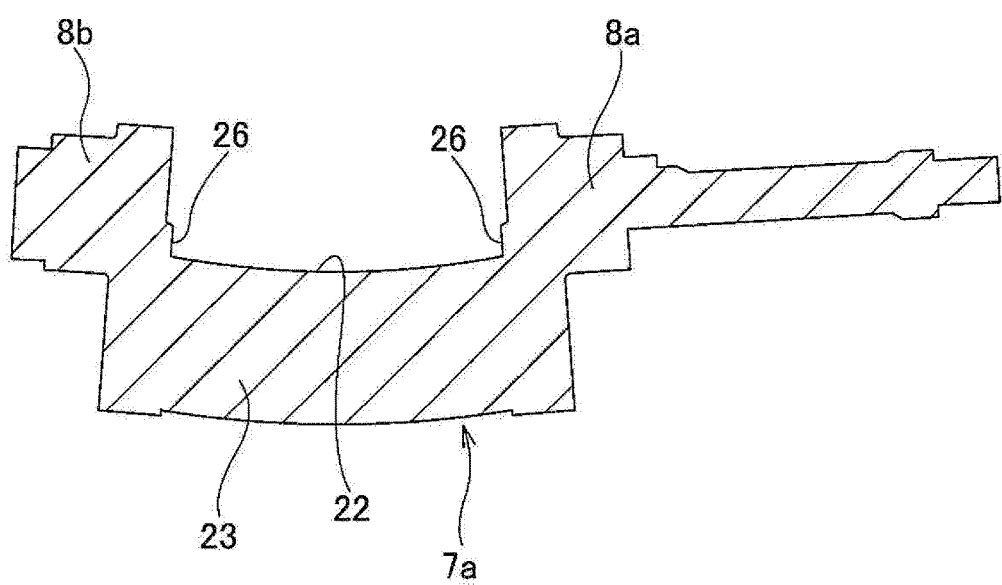
FIG. 29 is a cross-sectional view as seen from the same direction as in FIG. 27, and exaggeratedly illustrates the elastically deformed state of the trunnion due to a thrust load that is applied from the power roller.

By engaging a concave section 24 that is provided on the outside surface of the outer ring 16b and a cylindrical convex surface 22 of the support beam 23a, the outer ring 16b is supported by the trunnion 7b so as to be able to pivotally displace in the axial direction of the input disk 2 and output disk 5 (see FIG. 21). Moreover, by engaging a concave groove 27 that is formed around the inside surface of the concave section 24 of the outer ring 16b in the circumferential direction around the support beam 23a with a protrusion 28 that is formed around the outer-circumferential surface of the support beam 23a, displacement in the axial direction of the support beam 23a is restricted. When a power roller 6a (see FIG. 27 to FIG. 28) transmits torque, the inside surface of the concave groove 27 and the outside surface of the protrusion 28 come in contact with each other. This construction is the same as the construction disclosed in JP 2008-25821 (A). The construction of this example can be applied to a single toroidal continuously-variable transmission, as well as can be applied to a toroidal continuously-variable transmission that is combined with a planetary-gear mechanism such as disclosed in JP 2004-169719 (A).

Figure 1:
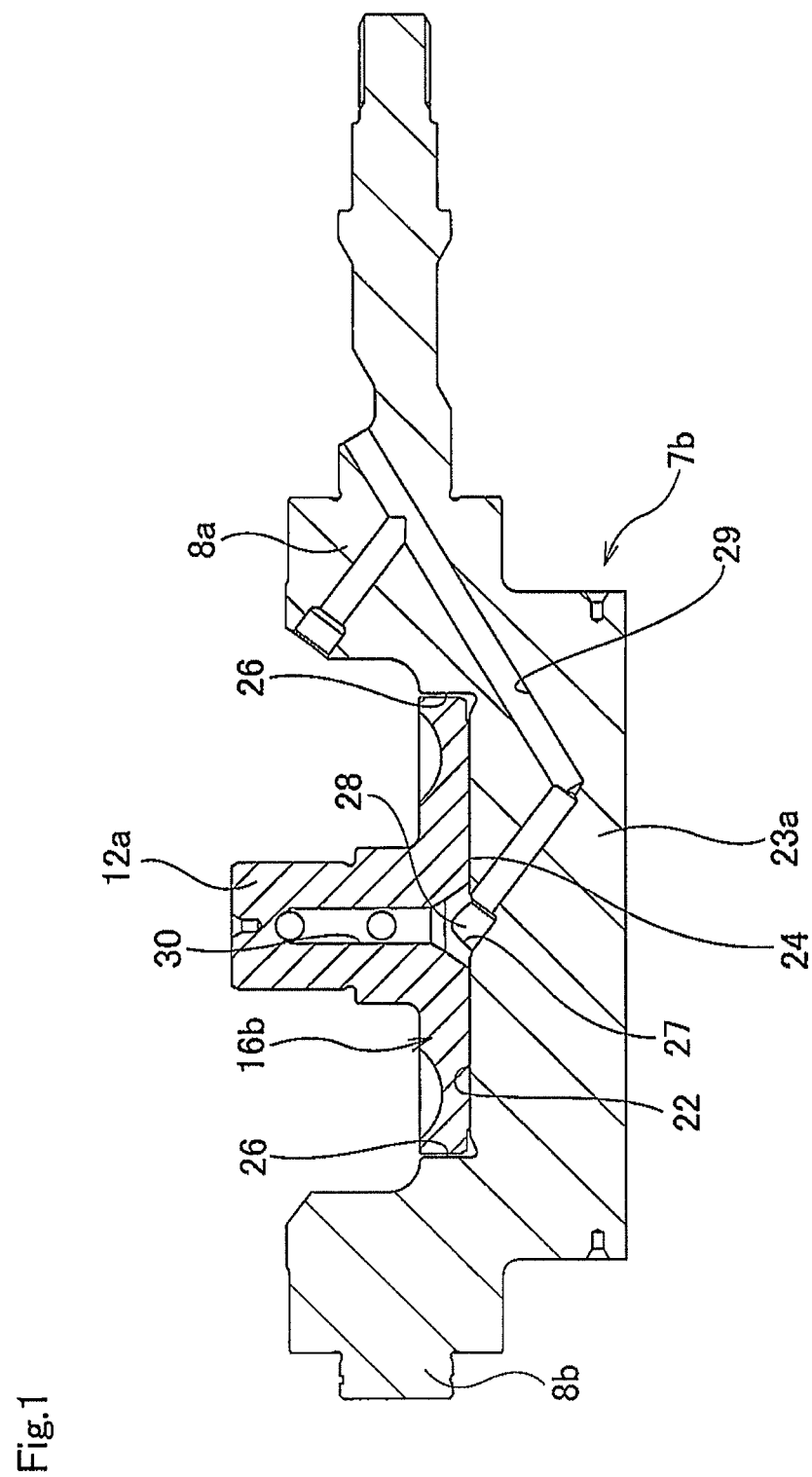
FIG. 1 is a cross-sectional view of a trunnion and an outer ring of a thrust rolling bearing of a first example of an embodiment of the present invention, and illustrates the removed state.
Figure 2:
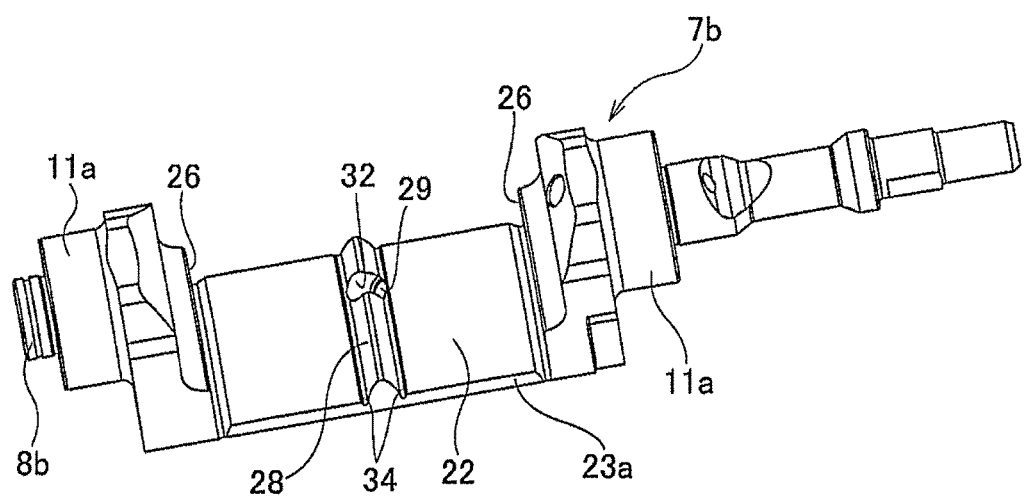
FIG. 2 is a perspective view of the trunnion of the first example, and illustrates the removed state as seen from the inside in the radial direction of the disks.
Figure 3:
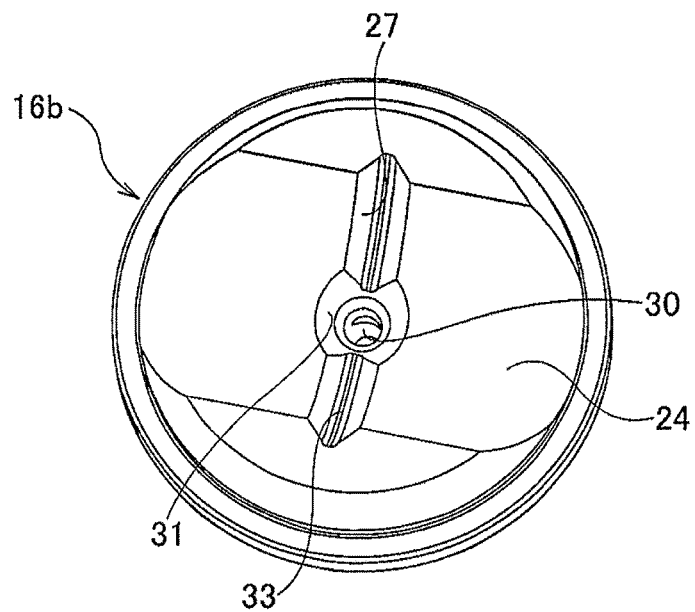
FIG. 3 is a perspective view of the outer ring of the first example, and illustrates the removed state as seen from the outside in the radial direction of the disks.
Figure 4:
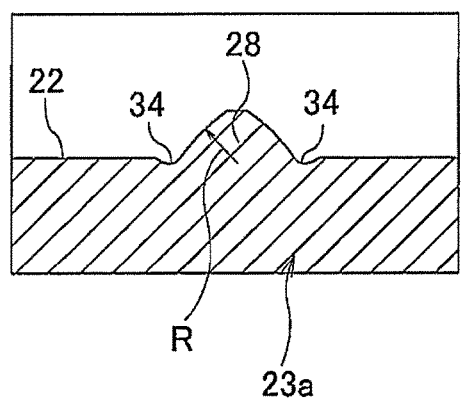
FIG. 4A is a cross-sectional view of a protrusion that is formed on the trunnion side of the first example.
FIG. 4B is a cross-sectional view of a concave groove that is formed on the outer ring side of the first example.
Figure 4:
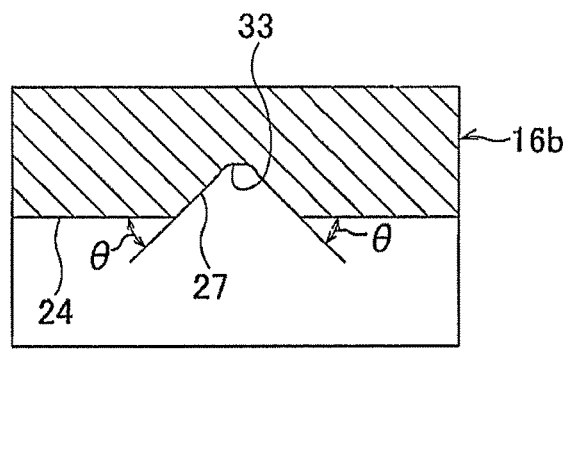
Figure 5:
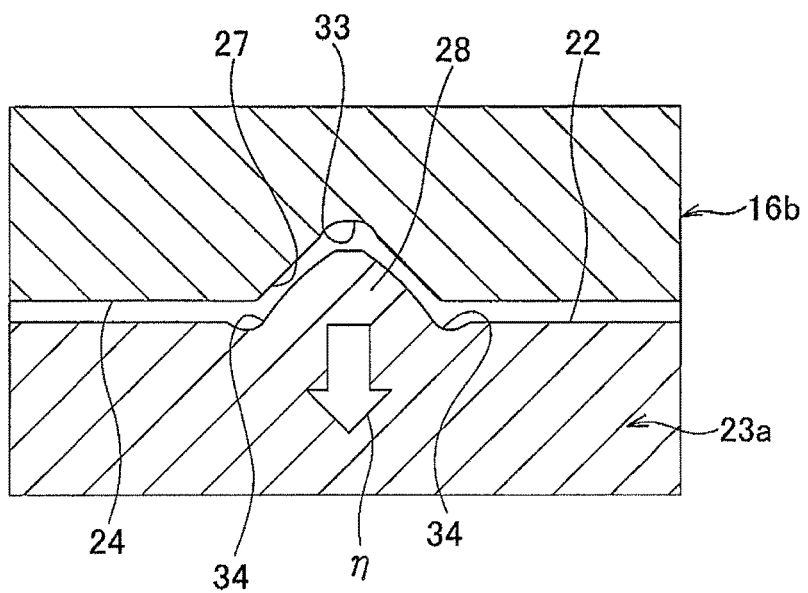
FIG. 5 is a cross-sectional view illustrating the engaged state of the protrusion and concave groove of the first example.
Figure 6:
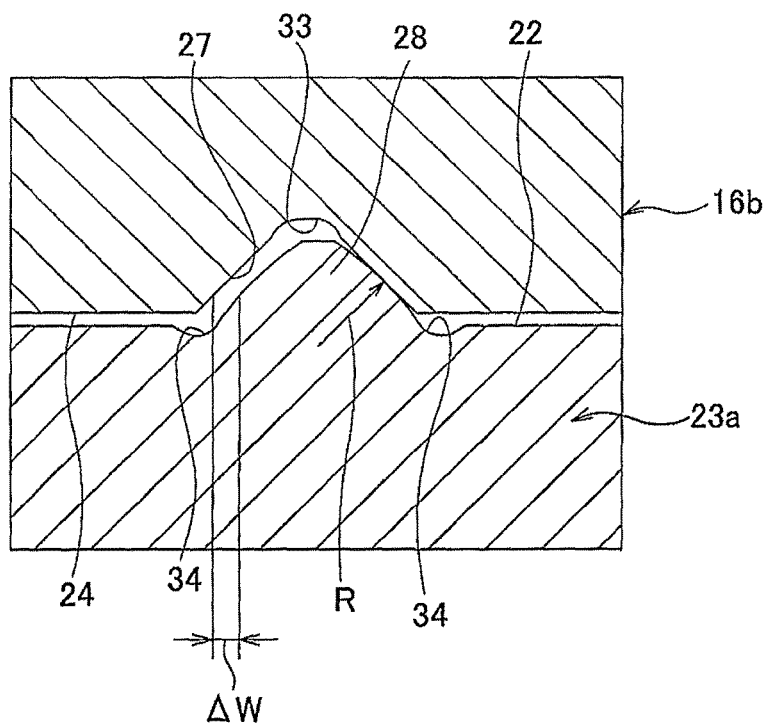
FIG. 6 is a partial cross-sectional view for explaining the concept of a gap in the engaged section between the protrusion and concave groove of the first example.

In this example, the concave groove 27 is a tapered groove having a wide opening and a narrow bottom. The cross-sectional shape of the inside surface of both sides of the concave groove 27 is straight as illustrated in FIG. 4B and FIG. 6. The angles θ (see FIG. 4B) that are formed by the extending lines from the inside surfaces of the concave groove 27 and the concave section 24 are about 45 degrees (40 to 50 degrees). The bottom section of the concave groove 27, as illustrated in FIG. 6, is constructed by a relief concave section 33 that is recessed more than the extending lines of the inside surfaces of both sides of the concave groove 27 and the arc-shaped surface that smoothly connects these inside surfaces, so the finishing process of these inside surfaces is facilitated. The concave section 24 and the concave groove 27 can be machined and ground at the same time without having to change the processing apparatus during the process, or in other words, without having to perform chucking during the process. Particularly, the grinding process for finishing is performed by grinding the concave section 24 and concave groove 27 with a single formed grindstone. As a result, the precision of the position of the concave section 24 and concave groove 27 is maintained.

Moreover, the protrusion 28 is a tapered protrusion having a wide base section and a narrow tip-end section. In this example, the outside surfaces of both sides of the protrusion are constructed by partial arcs that are curved in directions toward the inside surfaces on both sides of the concave groove 27 as illustrated in FIG. 4A and FIG. 6. In this example, the radius of curvature R of the partial arcs is 2 mm or greater, and preferably, 3 mm or greater, and even more preferably, 4 mm or greater, and yet even more preferably, 5 mm or greater. The portions of the outer-circumferential surface of the support beam 23a that are located on both sides of the protrusion 28 in the axial direction of the support beam 23a are constructed by relief concave sections 34 that are recessed more than the cylindrical convex surface 22 of the support beam 23a, so finishing of the outside surfaces of the protrusion 28 is facilitated. The outside surfaces of the protrusion 28 and the cylindrical convex surface 22 are also processed at the same time. Particularly, the grinding process for finishing is performed by grinding the outside surfaces of the protrusion 28 and the cylindrical surface 22 with a single formed grindstone. As a result, the positional precision of the outside surfaces of the protrusion 28 and the cylindrical convex surface 22 is maintained.

By making the cross-sectional shape of both sides of the protrusion 28 convex arcs, even though there is processing error in the outside surfaces of the protrusion 28 and the inside surface on both sides of the concave groove 27, it is possible to suppress wear of the areas of a rubbing between these side surfaces. In other words, when the cross-sectional shape of the outside surfaces of the protrusion 28 and the inside surfaces of the concave groove 27 are straight flat surfaces, the surface pressure of the areas of contact between these side surfaces is kept low, however, in this case, due to processing error, it is difficult to make the outside surfaces of the protrusion 28 and the inside surfaces of the concave groove 27 that face each other perfectly parallel. When the outside surfaces of the protrusion 28 and the inside surfaces of the concave groove 27 are not parallel, contact at the areas of rubbing between these surfaces is not uniform, so stress is concentrated on an end section of the protrusion 28 or the concave groove 27, and it becomes easy for wear to occur. In this example, the cross-sectional shape of the outside surfaces of the protrusion 28 are convex arcs, and the radius of curvature R of the partial arcs, which are convex arcs, is kept at 2 mm or greater.

Figure 7:
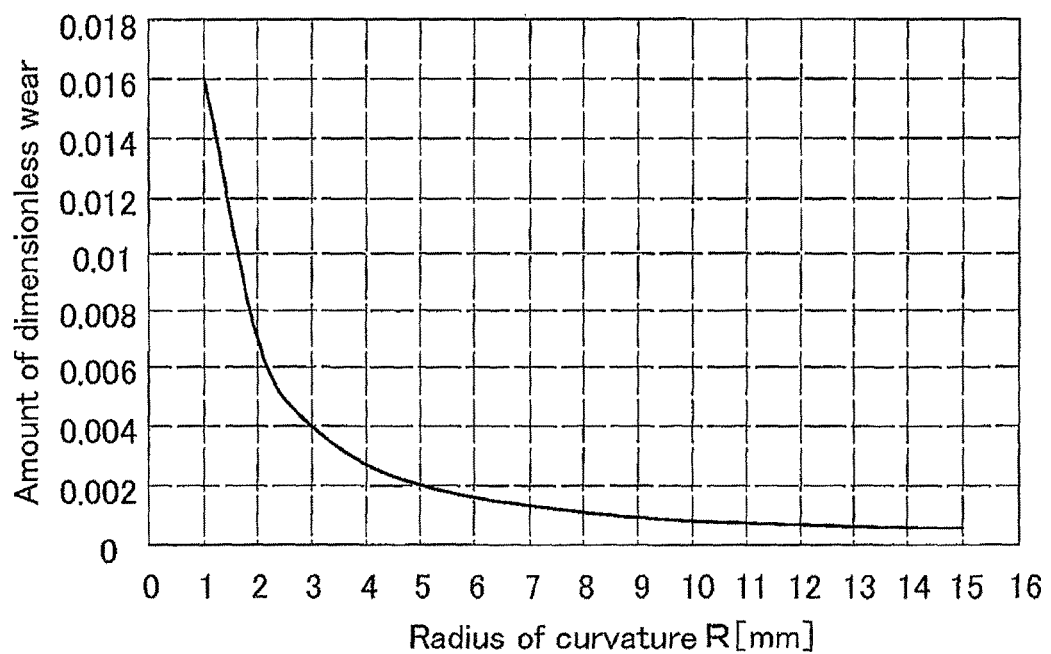
FIG. 7 is a graph illustrating the effect that the radius of curvature of the cross-sectional shape of the side surfaces of the protrusion has on the wear of the engaged section between the protrusion and concave groove.

Table 1 and FIG. 7 illustrate the effect that the radius of curvature R of the partial arcs have on the amount of wear at the areas of rubbing between the outside surface on both sides of the protrusion 28 and the inside surfaces on both sides of the concave groove 27. The vertical axis in FIG. 7 represents a dimensionless value that is obtained by dividing the amount of increase of gaps due to wear (unit: mm) by the radius of curvature R. The smaller the radius of curvature R is, the larger the size of the allowable processing error of the outside surfaces of the protrusion 28 and inside surfaces of the concave groove 27 becomes. However, as can be seen from Table 1 and FIG. 7, when the radius of curvature R of the partial arcs is less than 2 mm, the amount of wear of the areas of rubbing drastically increases. Therefore, by keeping the radius of curvature R at 2 mm or greater, it is possible to keep the wear of the areas of rubbing sufficiently low, while at the same time allow a certain amount of processing error. Furthermore, by keeping the radius of curvature preferably at 3 mm or greater, or more preferably at 4 mm or greater, or even more preferably at 5 mm or greater, it is possible to further reduce the amount of wear of the areas of rubbing. However, when the radius of curvature R of the partial arcs exceeds 10 mm, the effect of reducing the amount of wear of the areas of rubbing becomes saturated and there is hardly any change.

TABLE 1

| Radius of Curvature R [mm] | Increase in Gaps Due to Wear [mm] |
|---|---|
| 1 | 0.018 |
| 2 | 0.015 |
| 3 | 0.012 |
| 5 | 0.010 |
| 9 | 0.008 |
| 15 | 0.007 |

The Width Dimension of the Protrusion 28 is a Little Smaller than the Width Dimension of the Concave Groove 27.

The size relationship of the width dimension in this case compares the width dimensions of the portions of these members 27, 28 of which the positions in the radial direction of the support beam 23a are aligned with each other and that match each other in a state that the cylindrical convex surface 22 and the concave section 24 come in contact with each other. By regulating the size relationship of the width dimensions of the protrusion 28 and concave groove 27 as described above, the protrusion 28 does not bite into the concave groove 27 when the cylindrical convex surface 22 comes in contact with the concave section 24, so pivotal displacement of the outer ring 16b with respect to the support beam 23a is performed smoothly. Moreover, in a state in which the power roller 6a that is supported by the trunnion 7b does not transmit torque and the support beam 23a and outer ring 16b are not elastically deformed, the width of the concave groove 27 in the axial direction of the support beam 23a is larger than the width of the protrusion 28 in the portions of which the positions in the radial direction of the support beam 23a match each other by the amount indicated by ΔW in FIG. 6. In other words, in a state in which the support beam 23a and outer ring 16b are not elastically deformed, the amount that the outer ring 16b can displace in the axial direction of the support beam 23a with respect to the support beam 23a is regulated to the amount ΔW.

However, the amount (ΔW) that the width of the concave groove 27 is made larger than the width of the protrusion 28 is kept as small as possible within the range in which the size relationship of these widths is not reversed regardless of any manufacturing error. More specifically, looseness, which is the amount that the outer ring 16b displaces with respect to the support beam 23a in the axial direction of the support beam 23a (difference in the widths in the portions of which the positions in the radial direction match each other) is 0.100 mm or less, and preferably 0.050 mm or less.

Figure 22:
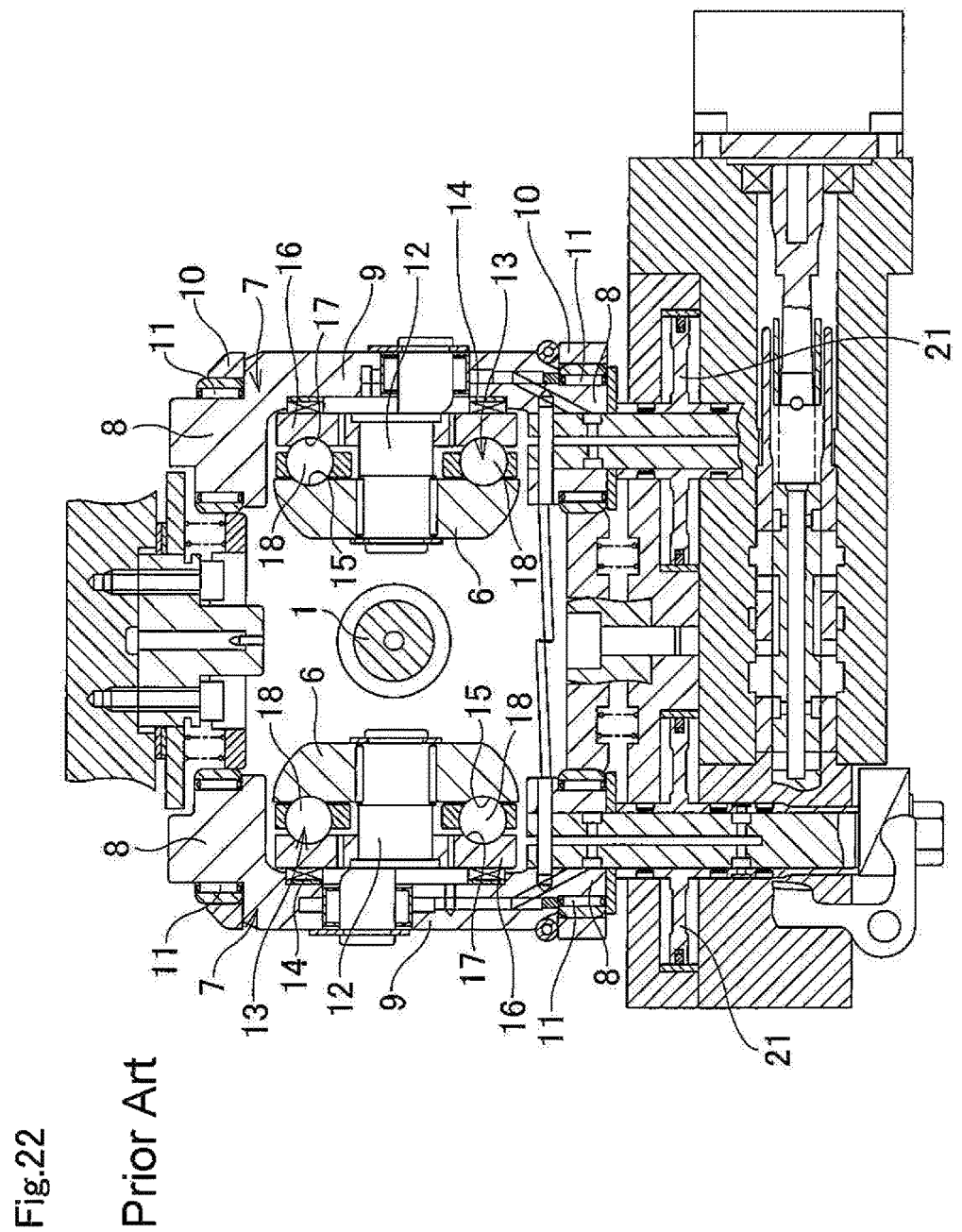
FIG. 22 is a cross-sectional view of section a-a in FIG. 21.
Figure 23:
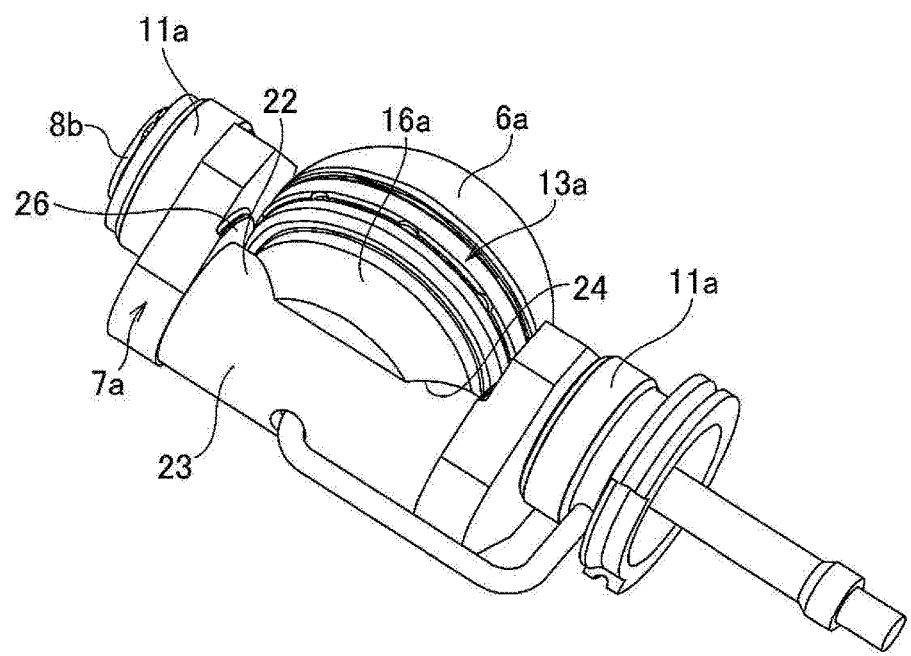
FIG. 23 is a perspective view of a trunnion that supports a power roller by way of a thrust ball bearing of a second example of conventional construction as seen from the outside in the radial direction of the disk.
Figure 24:
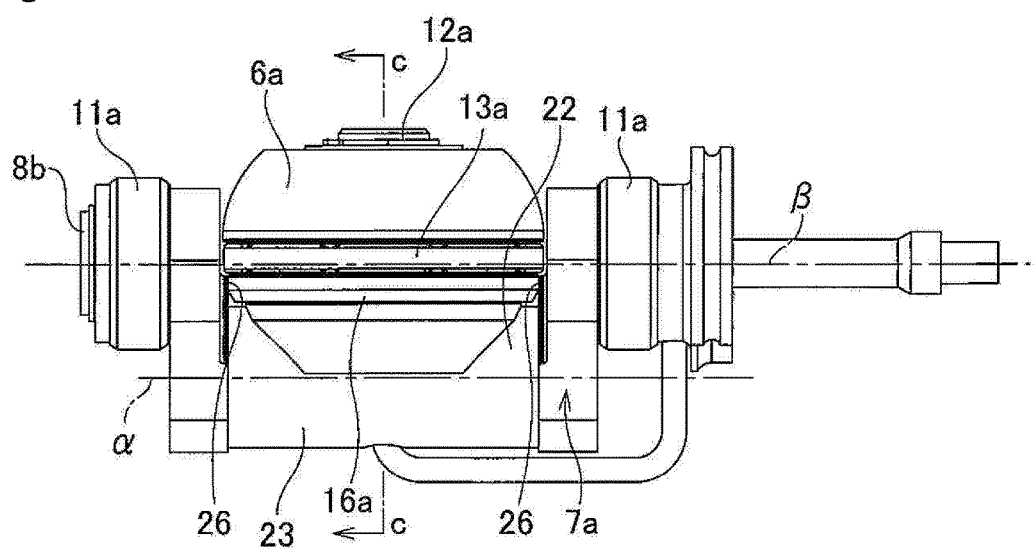
FIG. 24 is a front view of a trunnion that supports a power roller by way of a thrust ball bearing of the second example of conventional construction, and illustrates the state as seen from the circumferential direction of the disk.
Figure 25:
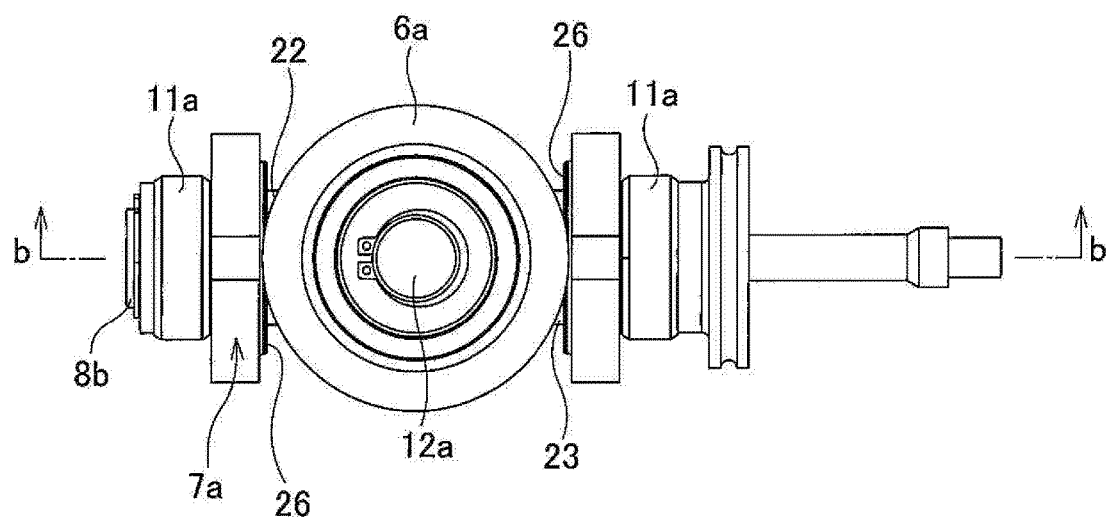
FIG. 25 is a top view as seen from above in FIG. 24.
Figure 26:
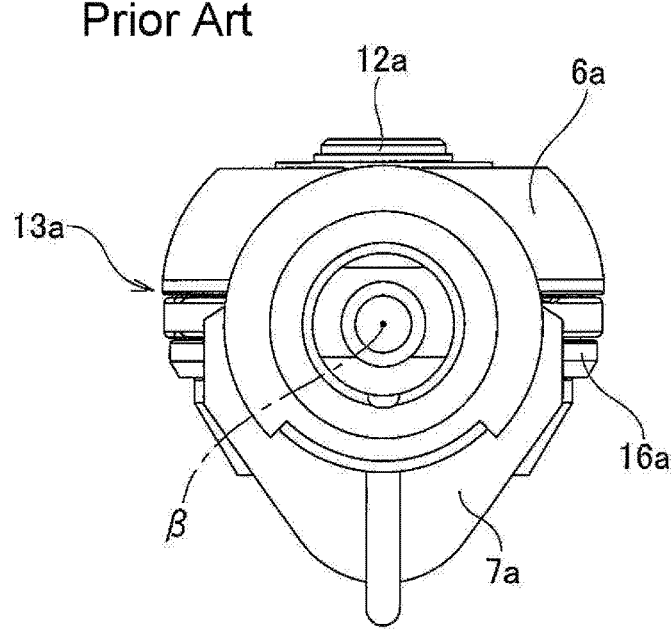
FIG. 26 is a side view as seen from the right side in FIG. 25.

Table 2 indicates the effect that the difference ΔW in the width of the concave groove 27 and the width of the protrusion 28 has on the feeling given to the driver that something is wrong when a speed change operation is performed that is not intended by the driver. As can be seen from Table 2, by keeping the difference in widths ΔW to 0.100 mm or less, the amount that the power roller 6a displaces in the axial direction of the trunnion 7b is kept small regardless of the function of the actuator 21 (see FIG. 22). Then, when the direction of transmission of torque by the toroidal continuously-variable transmission is reversed, the feeling that something is wrong that is given to the driver by an unintentional speed change operation being performed is kept small. By keeping the difference in widths ΔW to 0.050 mm or less, when the direction of transmission of torque by the toroidal continuously-variable transmission is reversed, it is possible to prevent giving the driver a feeling that something is wrong by preventing an unintentional speed change operation from being performed. In this way, the smaller the difference in widths ΔW is, the more the feeling that something is wrong that is given to the driver can be reduced.

TABLE 2

| Difference in widths ΔW of the Concave Groove 27 and Protrusion 28 [mm] | Speed Change Shock |
|---|---|
| 0.010 | None |
| 0.050 | None |
| 0.100 | A little |
| 0.150 | Exists |

Figure 8:
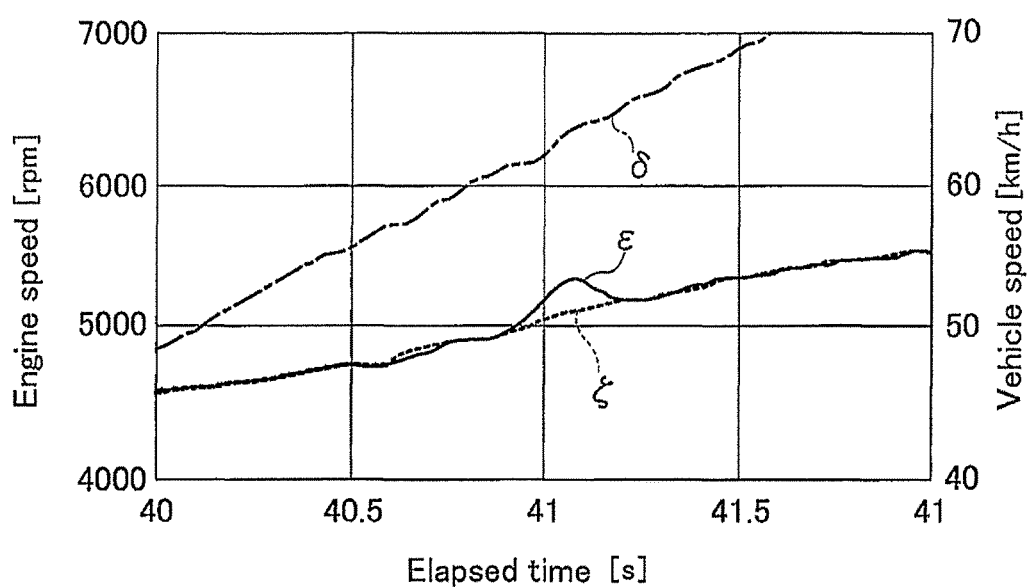
FIG. 8 is a graph for explaining how the size of the gap in the engaged section between the protrusion and concave groove is related to sudden fluctuation in the transmission ratio at the instant that the torque passing through a toroidal continuously-variable transmission is reversed.
Figure 9:
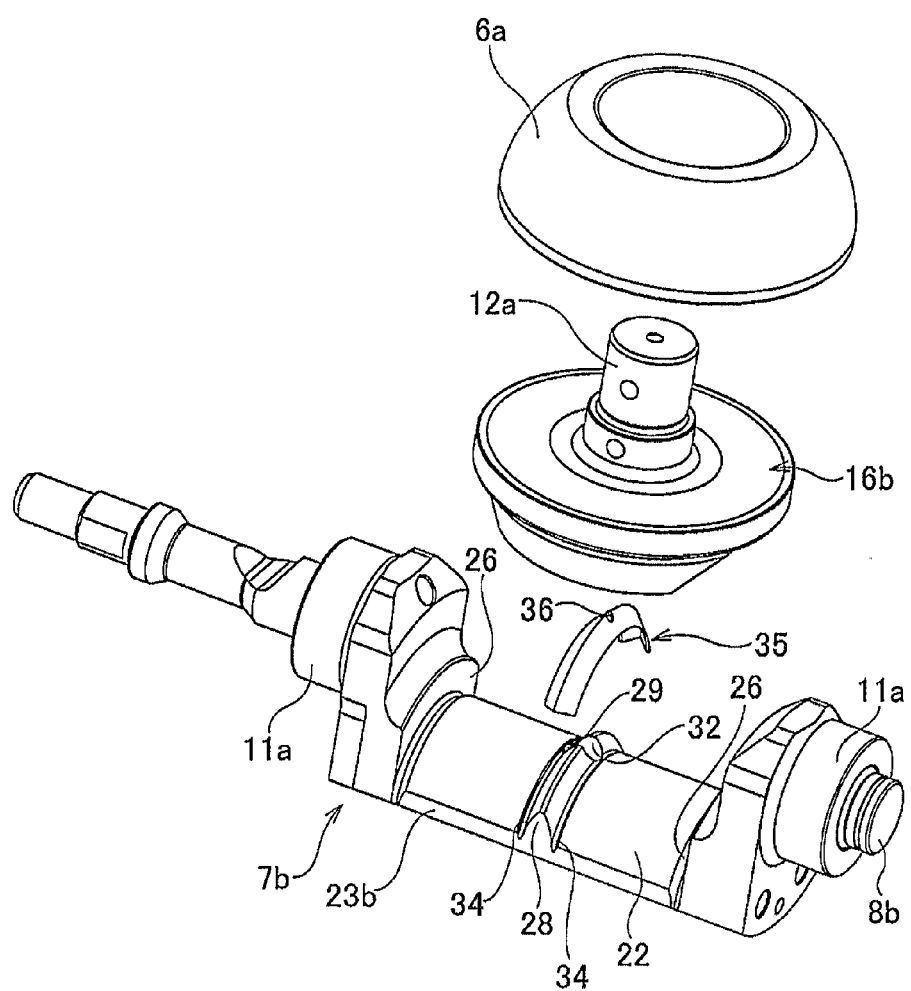
FIG. 9 is an exploded perspective view of a power roller, outer ring, spacer and trunnion of a second example of an embodiment of the present invention, and illustrates the removed state as seen from the inside in the radial direction of the disks.
Figure 10:
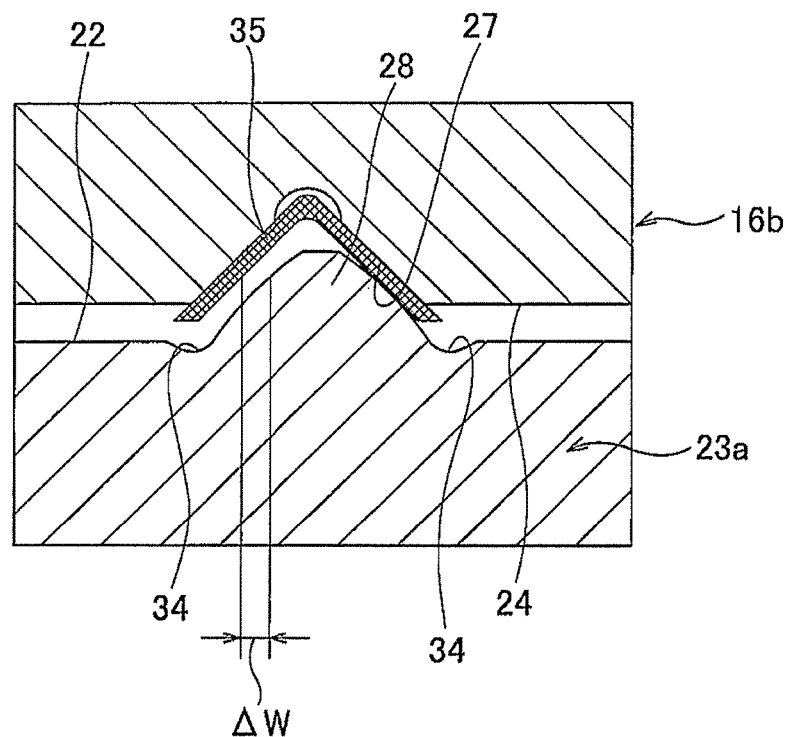
FIG. 10 is a cross-sectional view similar to FIG. 6 showing the outer ring, spacer and trunnion of the second example, and illustrates the assembled state.
Figure 11:
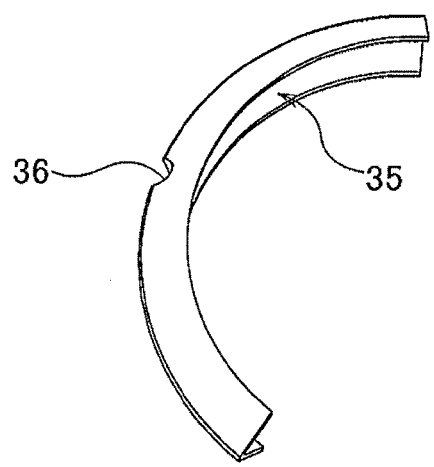
FIG. 11A is a perspective view of the spacer of the second example, and illustrates the removed state.
FIG. 11B is another perspective view thereof and illustrates the state as seen from a different direction than that of FIG. 11A.
Figure 11:
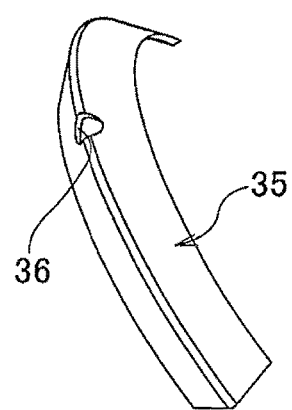
Figure 12:
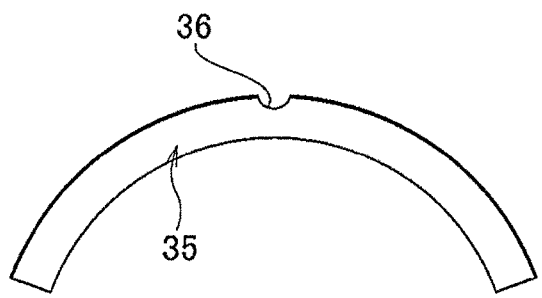
FIG. 12A is a view of a support beam of a second example as seen from the axial direction.
FIG. 12B is another view thereof as seen from above in FIG. 12A.
FIG. 12C is another view thereof as seen from the side in FIG. 12A.
Figure 12:
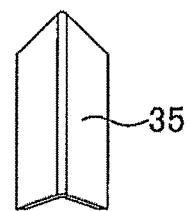
Figure 12:
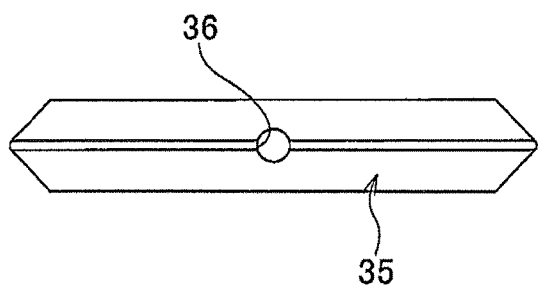

The effect obtained by reducing the difference in widths ΔW will be explained with reference to FIG. 8. FIG. 8 illustrates the state of each part during acceleration of a vehicle installed with a continuously-variable transmission that is a combination of a toroidal continuously-variable transmission, planetary-gear transmission and clutch apparatus, and that switches between a low-speed mode and high-speed mode by the clutch apparatus such as disclosed in JP 2004-169719 (A). The horizontal axis in FIG. 8 indicates the elapsed time, the vertical axis on the left side indicates the engine speed (rpm), and the vertical axis on the right side indicates the vehicle speed. In FIG. 8, the chain line δ represents the vehicle speed, the solid lines represents the engine speed when the difference in widths ΔW of the concave groove 27 and protrusion 28 was 0.125 mm, and the dashed line ζ represents the engine speed when the difference ΔW was 0.050 mm. When the elapsed time was 41 seconds, the clutch apparatus switches from the low-speed mode state to the high-speed mode state, and as a result, the transmission direction of torque by the toroidal continuously-variable transmission is reversed.

As can be seen from FIG. 8, when the difference ΔW of widths of the concave groove 27 and the protrusion 28 was 0.125 mm, the transmission ratio of the toroidal continuously-variable transmission suddenly changed, and, as a result, the engine speed suddenly rises. The reason for this is that as the transmission direction of torque by the toroidal continuously-variable transmission is reversed, the power roller 6a that is supported by the support beam 23a by way of the outer ring 16b displaces in the axial direction of the support beam 23a, and, as a result, the direction of the force in the tangential direction that acts on the traction section between the peripheral surface of the power roller 6a and the side surfaces in the axial direction of the input disk 2 and output disk 5 changes. For this reason, as the engine speed suddenly rises, a feeling that something is wrong is given to the driver. On the other hand, as in the case of this example, by making the difference in widths ΔW of the concave groove 27 and the protrusion 28 to be 0.050 mm, then even when the transmission direction of torque is reversed, the transmission ratio of the toroidal continuously-variable transmission does not change independently of the function of the actuator 21, and the engine speed does not suddenly rise, so a feeling that something is wrong is not given to the driver. However, when the difference ΔW is made to be 0 mm, the concave section 24 of the outer ring 16b rides up onto the tip-end surface of the protrusion 28 that is formed on the support beam 23a and there is a possibility that damage to the outer ring 16b and trunnion 7b will occur, and there is a possibility that the durability of the toroidal continuously-variable transmission will decrease. Moreover, when the concave section 24 rides up onto the protrusion 28, the assembly performance of the toroidal continuously-variable transmission is impaired.

The torque that is transmitted by the toroidal continuously-variable transmission becomes large, and, as a result, as the thrust load that is applied from the power roller 6a to the support beam 23a by way of the outer ring 16b becomes large, the support beam 23a elastically deforms into an arc shape so that the side where the outer ring 16b is located becomes concave. As a result, as indicated by arrow η in FIG. 5, the protrusion 28 displaces in the direction of coming out from the concave groove 27, and there is a tendency for the gaps between the outside surfaces on both sides of the protrusion 28 and the inside surfaces on both sides of the concave groove 27 to become larger. However, the actual amount that the gaps become larger is small. While the difference in widths ΔW of the concave groove 27 and protrusion 28 is kept very small at 0.100 mm or less in a state that the power roller 6a does not transmit torque and the support beam 23a and outer ring 16a are not elastically deformed, when transmitting large torque, there becomes a tendency for the gaps to become large, so the protrusion 28 is not held between the inside surfaces of the concave groove 27 and pivotal displacement of the outer ring 16b around the support beam 23a is performed smoothly. Moreover, even when the engine speed changes due to some fluctuation in the transmission ratio in a state that the torque to be transmitted by the toroidal continuously-variable transmission is large, the feeling that something is wrong that is given to the driver is kept low compared to when low torque is transmitted, so there is no particular problem.

Moreover, this example is constructed such that lubrication oil (traction oil) is supplied to a thrust ball bearing 13a and radial needle bearing 25 (see FIG. 27 and FIG. 28) that are provided between the outer ring 16b and power roller 6a by way of an upstream lubrication oil path 29 that is formed inside the trunnion 7b and a downstream lubrication oil path 30 that is provided inside the support shaft 12a. Regardless of pivotal displacement of the outer ring 16b with respect to the support beam 23a, the opening on the downstream end of the upstream lubrication oil path 29 and the opening on the upstream end of the downstream lubrication oil path 30 remain connected. In order for this, a circular center concave section 31 having an opening diameter that is larger than the width dimension of the concave groove 27 is formed in the center section in the circumferential direction of the concave groove 27 so as to be aligned with the opening on the upstream end of the downstream lubrication oil path 30. Moreover, a notch section 32 is formed in the center section in the circumferential direction of the protrusion 28 so as to be aligned with the opening on the downstream end of the upstream lubrication oil path 29. Even when the outer ring 16b pivotally displaces with respect to the support beam 23a as the torque that is transmitted by the toroidal continuously-variable transmission fluctuates, the upstream lubrication oil path 29 and the downstream lubrication oil path 30 remain connected by way of the notch section 32 and the center concave section 31. Therefore, it is possible to stably supply lubrication oil to the thrust ball bearing 13a and radial needle bearing 25 through the upstream lubrication oil path 29 and the downstream lubrication oil path 30 regardless of pivotal displacement of the outer ring 16b around the support beam 23a.

As long as the force "2Ft" is supported, it is possible to form a protrusion around the inside surface of the concave section of the outer ring, and form a concave groove around the cylindrical convex surface of the support beam, so that the protrusion and the concave groove engage.

Second Example

FIG. 9 to FIG. 12 illustrate a second example of an embodiment of the present invention. In this example, a spacer 35 is mounted to a concave groove 27 that is formed in the circumferential direction in a concave section 24 of an outer ring 16b. The spacer 35 is formed into an arc shape having a V-shaped cross-sectional shape, and is formed to correspond to the shape of the inner surface of the concave groove 27 using a metal material or the like having sufficient resistance to compression and wear, and preferably having self-lubrication property. More specifically, the spacer 35 is made using a steel material, a ceramic material, a titanium alloy, a copper alloy such as brass, an aluminum alloy or the like. When the spacer 35 is made of a steel material, heat treatment such as carbonizing treatment, nitriding, carbonitriding or the like can be performed. Moreover, it is also possible to provide a hard coating layer having a low coefficient of friction such as a diamond-like carbon (DLC) layer. Particularly, when the spacer 35 is made of a metal material, the hardness should be 354 Hv or greater, and the surface roughness (Ra) should be 0.8 μm or less. A through hole 36 is formed in the center section in the circumferential direction of the spacer 35. When the spacer 35 is mounted inside the concave groove 27, the outside surface of the spacer 35 comes in contact with the inside surface of the concave groove 27 with no gaps, and the through hole 36 is aligned with the opening on the upstream end of the downstream lubrication oil path 30 that is located in the center section in the circumferential direction of the concave groove 27.

A protrusion 28 that is formed in the circumferential direction around the outer-circumferential surface of a support beam 23a on the trunnion side 7b engages with the inside of the spacer 35. In other words, the protrusion 28 and the concave groove 27 engage by way of the spacer 35 such that relative displacement in the circumferential direction is possible, and so that displacement of these members 27, 28 in the axial direction of the support beam 23a is suppressed. In this way, in the engaged state of the protrusion 28 and the concave groove 27, the distance that the outer ring 16b is able to move in the axial direction of the support beam 23a with respect to the trunnion 7b (looseness ΔW in the axial direction) is kept to 0.100 mm or less, and preferably 0.050 mm or less. In order for this, in this example, various different spacers 35, the thickness of which vary a little in the axial direction of the support beam 23a, are prepared, and a spacer 35 having a suitable thickness dimension that is selected from among those is assembled between the protrusion 28 and the concave groove 27. The construction and functions of the other parts are the same as in the first example.

Figure 13:
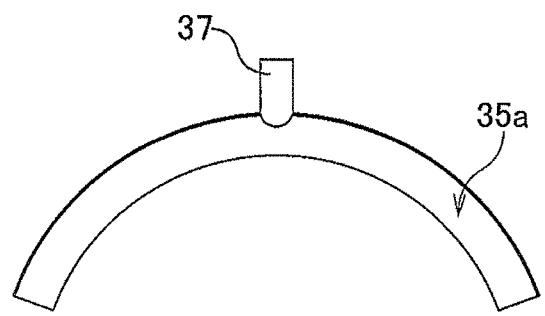
FIG. 13 is a view similar to that of FIG. 12A and illustrates a different example of the construction of the spacer that is applied in the second example.

In the case of construction of assembling a spacer between the protrusion 28 and concave groove 27 such as in this example, it is also possible to alternatively use a spacer such as illustrated in FIG. 13 and FIG. 14B. The spacer 35a that is illustrated in FIG. 13 is such that an oil tube 37 in the center section of the outer-circumferential surface is connected and fastened to the outer-circumferential surface of the spacer 35a so as to project outward in the radial direction. When the spacer 35a is assembled between the protrusion 28 and the concave groove 27, the oil tube 37 fits inside a downstream lubrication path 30 (see FIG. 1 and FIG. 3) that is formed on the outer ring side 16b. Therefore, the outer ring 16b and spacer 35a pivotally displace in synchronization with respect to the support beam 23a of the trunnion 7b.

The spacer 35b that is illustrated in FIG. 14A is constructed so that the cross-sectional shapes of the inside surfaces on both sides are convex arc shapes, and the cross-sectional shapes of the outside surfaces on both sides are straight, and the spacer 35b is assembled between the inside surfaces on both sides of the concave groove 27 with no gaps. The spacer 35c that is illustrated in FIG. 14B is constructed such that the cross-sectional shapes of the outside surfaces of both sides are convex arc shapes, and the cross-sectional shapes of the inside surfaces on both sides are straight, and the spacer 35b is assembled on the outside of the protrusion 28 with no gaps. By using the spacers 35b, 35c that are illustrated in FIG. 14A and FIG. 14B, the cross-sectional shapes of the inside surfaces of the concave groove 27 and the outside surfaces of the protrusion 28 are straight, so processing of the concave groove 27 and the protrusion 28 can be facilitated, and even when the outside surfaces of the protrusion 28 and the inside surfaces of the concave groove 27 that face each other are not completely parallel, it is possible to suppress wear of the areas of rubbing between these side surfaces.

Third Example

Figure 15:
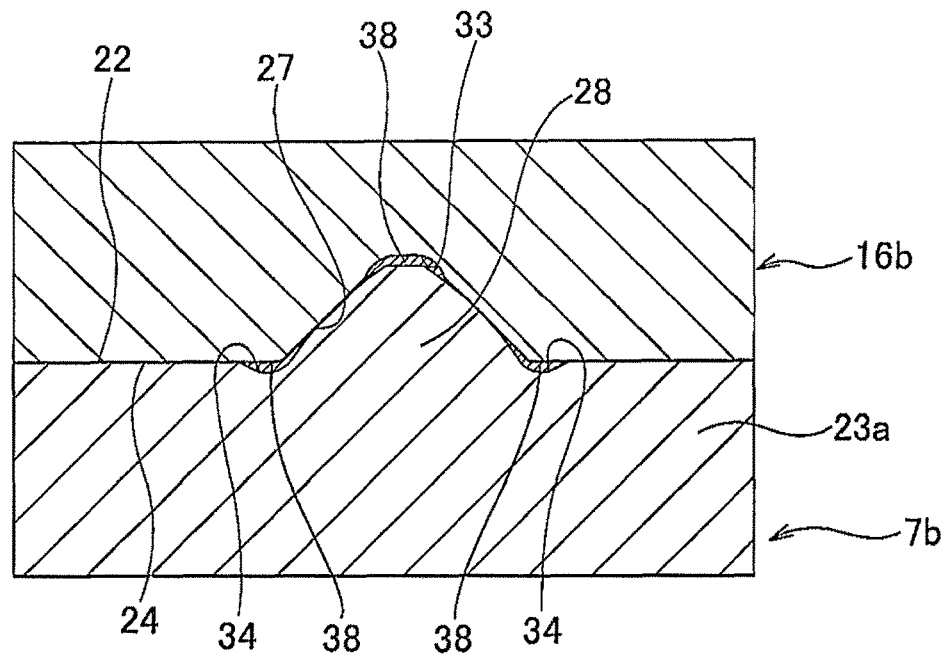
Figure 15:
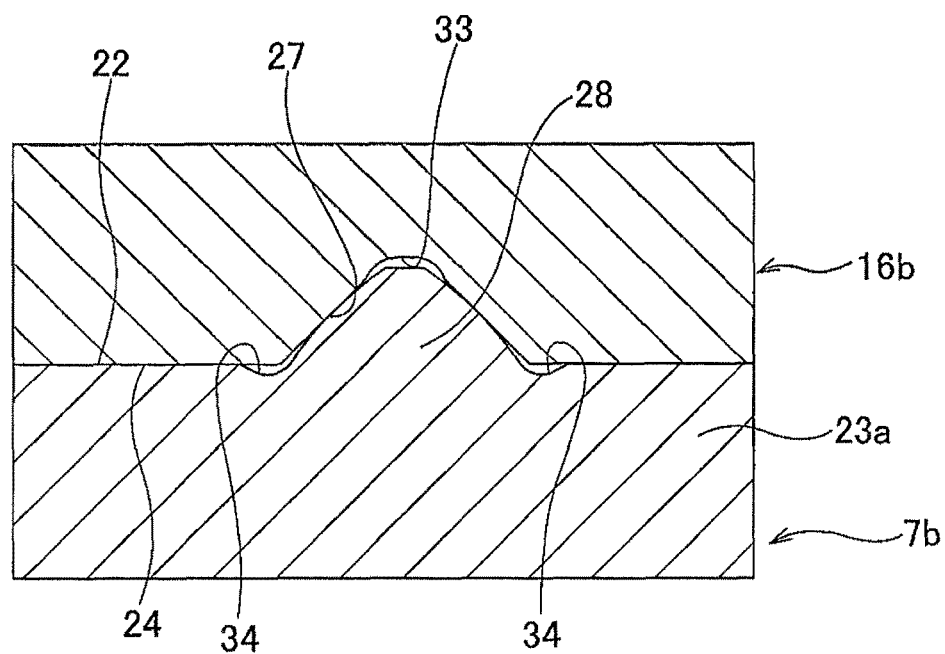
Figure 16:
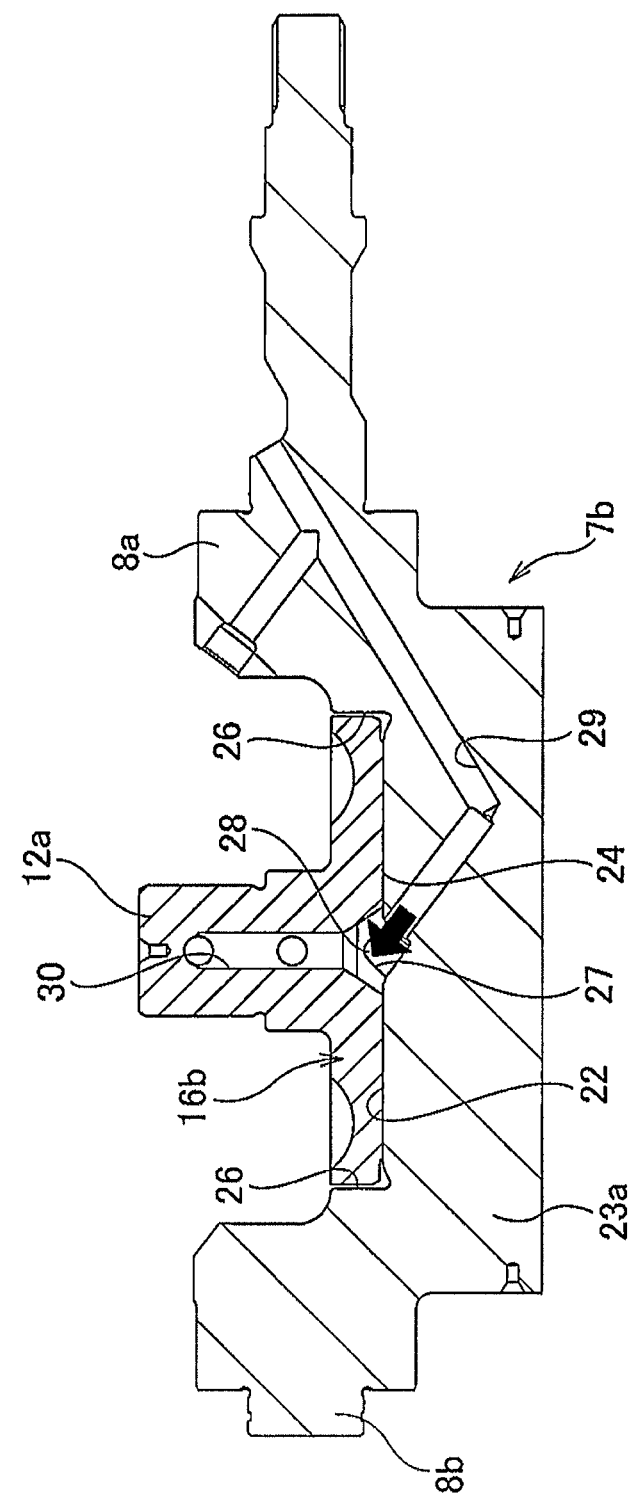
FIG. 16 is a cross-sectional view of an outer ring and trunnion of the third example of the present invention, and illustrates the assembled state.

FIG. 15A to FIG. 16 illustrate a third example of an embodiment of the present invention. In this example, relief concave sections 34 that are recessed in the radial direction are formed in portions of the outer-circumferential surface of a support beam 23a of a trunnion 7b that are located on both sides of a protrusion 28. Moreover, a relief concave section 33 is formed in the bottom section of a concave groove 27 that is formed around the inside of a concave section 24 of an outer ring 16b. An elastic sealing material 38 such as a liquid gasket, rubber, or an engineered plastic such as nylon, acrylic, PEEK, fluororesin that are processed to match the shape of the relief concave sections 34, 33 is filled in between the relief concave sections 34, 33 and the inside surface of the concave section 24 and the tip-end surface of the protrusion 28, that are surfaces that the relief concave sections 34, 33 face.

In this example, the sealing material 38 that is filled in between the relief concave sections 34, 33 and the inside surface of the concave section 24 and the tip-end surface of the protrusion 28 prevents lubrication oil that flows in the direction of the arrow in FIG. 16 from an upstream lubrication oil path 29 that is formed inside the trunnion 7b toward a downstream lubrication oil path 30 that is provided inside the outer ring 16b from leaking to the surroundings. The construction and functions of the other parts are the same as in the first example of an embodiment.

Fourth Example

Figure 17:
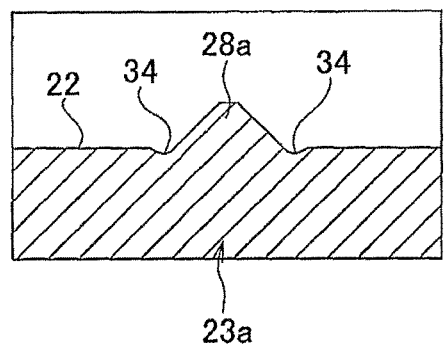
FIG. 17A and FIG. 17B are views similar to FIG. 4A and FIG. 4B, and illustrate a fourth example of an embodiment of the present invention.
Figure 17:
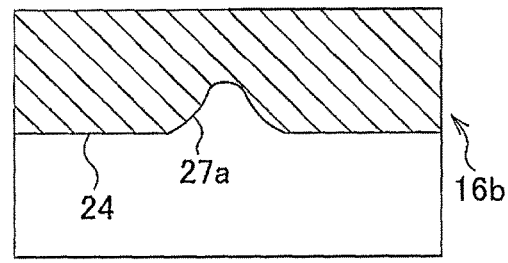

FIG. 17A and FIG. 17B illustrate a fourth example of an embodiment of the present invention. In this example, opposite from the case of the first example of an embodiment, the cross-sectional shapes of the inside surfaces on both sides of the concave groove 27a are convex arc shaped, and the cross-sectional shapes of the outside surfaces on both sides of the protrusion 28a are straight. The construction and functions of the other parts are the same as in the first example of an embodiment.

Fifth Example

Figure 18:
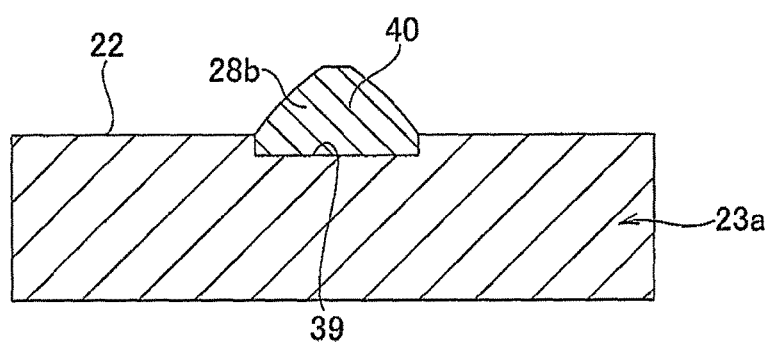
FIG. 18 is a view similar to FIG. 4A, and illustrates a fifth example of an embodiment of the present invention.

FIG. 18 illustrates a fifth example of an embodiment of the present invention. In this example, a concave groove 39 is formed in the circumferential direction of part of the outer-circumferential surface of the support beam 23b, and the base end section of an attachment bracket 40 that is made of a metal material having sufficient strength and durability, as well as resistance to wear, is fitted into and fastened to the concave groove 39 with an interference fit. From the middle section to the tip-end section in the radial direction of the attachment bracket 40 is taken to be a protrusion 28b. The construction and functions of the other parts are the same as in the first example of an embodiment.

Sixth Example

Figure 19:
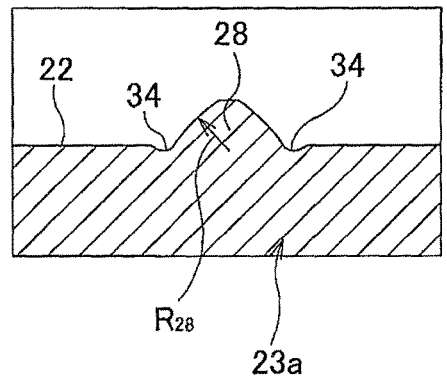
FIG. 19A and FIG. 19B are views similar to FIG. 4A and FIG. 4B, and illustrate a sixth example of an embodiment of the present invention.
Figure 19:
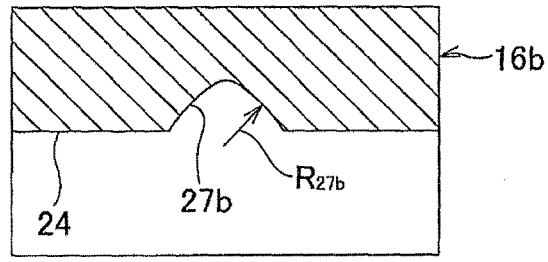

FIG. 19a and FIG. 19B illustrate a sixth example of an embodiment of the present invention. In this example, the cross-sectional shapes of the outside surfaces on both sides of a protrusion 28 are convex arc shapes, and the cross-sectional shapes of the inside surfaces on both sides of a concave groove 27b are concave arc shapes that correspond to the cross-sectional shapes of both inside surfaces of the protrusion 28. The radius of curvature $R_{27b}$ of the concave arc that is the cross-sectional shape of both inside surfaces of the concave groove 27b is greater than the radius of curvature $R_{28}$ of the convex arc that is the cross-sectional shape of the protrusion 28 ($R_{27b} > R_{28}$). As a result, in this example, the surface pressure at the areas of contact between the outside surfaces of the protrusion 28 and the inside surfaces of the concave groove 27b is kept lower when compared with the construction of the first example of an embodiment, and the wear at the areas of rubbing between the outside surfaces of the protrusion 28 and the inside surfaces of the concave groove 27b is further suppressed. Moreover, of the gaps between the outside surfaces of the protrusion 28 and the inside surfaces of the concave groove 27b, the width of the portions that are separated from the portions where the outside surfaces of the protrusion 28 protrude the most toward the inside surfaces of the concave groove 27b are kept less than in the construction of the first example of an embodiment. Therefore, the lubrication oil that is supplied from the center concave section 31 (see FIG. 3) that is formed in the center section in the circumferential direction of the concave groove 27 is kept from flowing out through the gaps between the outside surfaces of the protrusion 28 and the inside surfaces of the concave groove 27b. The construction and functions of the other parts are the same as in the first example of an embodiment.

Seventh Example

Figure 20:
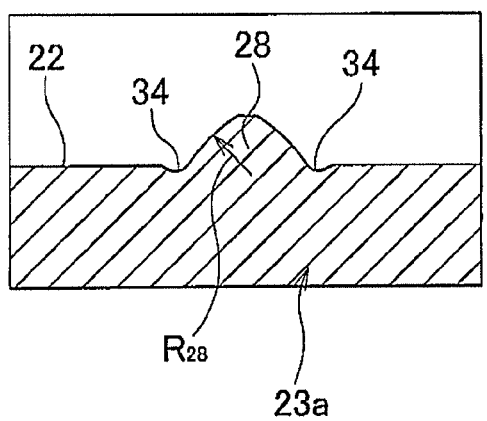
FIG. 20A and FIG. 20B are views similar to FIG. 4A and FIG. 4B, and illustrate a seventh example of an embodiment of the present invention.
Figure 20:
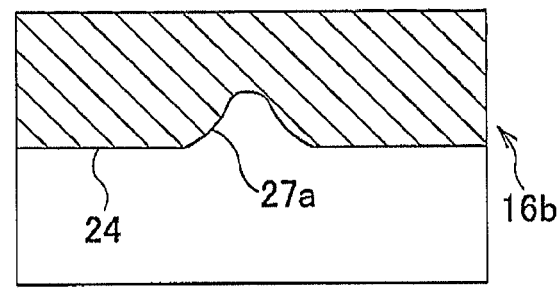

FIG. 20A and FIG. 20B illustrate a seventh example of an embodiment of the present invention. In this example, the cross-sectional shapes of the outside surfaces on both sides of the protrusion 28 are convex arcs, and the cross-sectional shapes of the inside surfaces of both sides of the concave groove 27a are also convex arcs. The radius of curvature of both convex arcs of the cross-sectional shapes of the outside surfaces of the protrusion 28 and the inside surfaces of the concave groove 27a is 4 mm or more. As a result, of the gaps between the outside surfaces of the protrusion 28 and the inside surfaces of the concave groove 27a, the widths of the portions that are separated from the portions where the outside surfaces of the protrusion 28 protrude the most toward the inside surfaces of the concave groove 27a (portions where the inside surfaces of the concave groove 27a protrude the most toward the outside surfaces of the protrusion 28) are greater than in the construction of the first example of an embodiment. As a result, of the lubrication oil that is supplied from the center concave section 31 (see FIG. 3) that is formed in the center section in the circumferential direction of the concave groove 27, the amount that flows into the gaps between the outside surfaces of the protrusion 28 and the inside surfaces of the concave groove 27b increases, and thus the lubrication at the areas of contact between these side surfaces is improved, and wear at the areas of rubbing between these side surfaces is further suppressed. The construction and functions of the other parts are the same as in the first example of an embodiment.

EXPLANATION OF REFERENCE NUMBERS

1 Input rotating shaft
2 Input disk
3 Output cylinder
4 Output gear
5 Output disk
6, 6a Power roller
7, 7a, 7b Trunnion
8, 8a, 8b Pivot shaft
9 Support beam
10 Support plate
11, 11a Radial needle bearing
12, 12a Support shaft
13, 13a Thrust ball bearing
14 Thrust needle bearing
15 Inner-ring raceway
16, 16a, 16b Outer ring
17 Outer-ring raceway
18 Ball 19 Drive shaft
20 Pressure apparatus
21 Actuator
22 Cylindrical convex surface
23, 23a, 23b Support beam
24 Concave section
25 Radial needle bearing
26 Stepped surface
27, 27a Concave groove
28, 28a, 28b Protrusion
29 Upstream lubrication oil path
30 Downstream lubrication oil path
31 Center concave section
32 Notch
33 Relief concave section
34 Relief concave section
35, 35a, 35b, 35c Spacer
36 Through hole
37 Oil tube
38 Sealing material
39 Concave groove
40 Attachment bracket

What is claimed is:

1. A toroidal continuously-variable transmission comprising:
at least one pair of disks each having an axially one side surface which is a toroidal curved surface and concentrically supported such that relative rotation is possible in a state that the axially one side surfaces thereof are made to face each other; and
plural combinations of a trunnion, a power roller and a thrust rolling bearing that are provided at plural locations in the circumferential direction between the axially one side surfaces of the disks;
in each combination of the trunnion, the power roller and the thrust rolling bearing, the trunnion comprising:
a pair of pivot shafts provided on both end sections of the trunnion so as to be concentric with each other, and so as to be located at positions in the axial direction that are skewed with respect to the center axis of the disks; and
a support beam located between the pivot shafts and having an inside surface in the radial direction of the disks which is a cylindrical convex surface having a center axis that is parallel to the center axis of the pivot shafts and that is located further on the outside in the radial direction of the disk than the center axis of the pivot shafts, the trunnion being able to pivotally displace freely around the pivot shafts;
the power roller supported by the inside surface of the trunnion by way of the thrust rolling bearing so as to be able to rotate freely, and the peripheral surface thereof, which is a spherical convex surface, coming in contact with the axially one side surfaces of the disks;
the thrust rolling bearing provided between the support beam of the trunnion and the outside surface of the power roller, and comprising: an outer ring that is provided on the support-beam side; and plural rolling bodies that are provided between an outer-ring raceway that is provided around an inside surface of the outer ring, and an inner-ring raceway that is provided around an outside surface of the power roller; and
the outer ring having a concave section provided on the outside surface thereof and supported by the trunnion so as to be able to pivotally displace by engaging the concave section with the cylindrical convex surface of the support beam; the concave section provided with a concave groove, which is a tapered groove having a wide opening and a narrow bottom, that is formed on the inner surface thereof and the cylindrical convex surface provided with a tapered protrusion having a wide base section and a narrow tip-end section that is formed in the circumferential direction around the support beam, and displacement of the outer ring in the axial direction of the support beam being restricted by engaging the concave groove with the tapered protrusion,
wherein the cross-sectional shape of at least one of the inside surfaces of the concave groove and the outside surfaces of the protrusion is a partial arc that is curved in a direction so as to protrude toward the other of the inside surfaces of the concave groove and the outside surfaces of the protrusion.

2. The toroidal continuously-variable transmission according to claim 1, wherein the radius of curvature of the partial arc is 2 mm or more.

3. The toroidal continuously-variable transmission according to claim 1, wherein the narrow bottom of the concave groove is constructed by a relief concave section that is recessed more than extending lines of inside surfaces of the concave groove on both sides of the narrow bottom and an arc-shaped virtual surface that smoothly connects the inside surfaces, and relief concave sections that are recessed more than the cylindrical convex surface of the support beam are provided in portions on an outer-circumferential surface of the support beam that are located on both sides of the protrusion in the axial direction of the support beam.

4. The toroidal continuously-variable transmission according to claim 1, wherein in a state where the power roller does not transmit torque and there is no elastic deformation of the support beam and outer ring, the width of the concave groove is larger than the width of the protrusion in portions where positions in the radial direction of the support beam match each other, and looseness that is the amount that the outer ring is able to displace in the axial direction of the support beam with respect to the support beam is 0.100 mm or less and greater than 0 mm.

5. The toroidal continuously-variable transmission according to claim 4, wherein in order to keep the looseness to 0.100 mm or less and greater than 0 mm, a spacer that is formed in a partial arc shape that corresponds to the at least one of the inside surfaces of the concave groove and the outside surfaces of the protrusion is mounted to the at least one of the inside surfaces and the outside surfaces.

6. A toroidal continuously-variable transmission comprising:
at least one pair of disks each having an axially one side surface which is a toroidal curved surface and concentrically supported such that relative rotation is possible in a state that the axially one side surfaces thereof are made to face each other; and
plural combinations of a trunnion, a power roller and a thrust rolling bearing that are provided at plural locations in the circumferential direction between the axially one side surfaces of the disks;
in each combination of the trunnion, the power roller and the thrust rolling bearing, the trunnion comprising:
a pair of pivot shafts provided on both end sections of the trunnion so as to be concentric with each other, and so as to be located at positions in the axial direction that are skewed with respect to the center axis of the disks; and
a support beam located between the pivot shafts and having an inside surface in the radial direction of the disks which is a cylindrical convex surface having a center axis that is parallel to the center axis of the pivot shafts and that is located further on the outside in the radial direction of the disk than the center axis of the pivot shafts, the trunnion being able to pivotally displace freely around the pivot shafts;

the power roller supported by the inside surface of the trunnion by way of the thrust rolling bearing so as to be able to rotate freely, and the peripheral surface thereof, which is a spherical convex surface, coming in contact with the axially one side surfaces of the disks;

the thrust rolling bearing provided between the support beam of the trunnion and the outside surface of the power roller, and comprising: an outer ring that is provided on the support-beam side; and plural rolling bodies that are provided between an outer-ring raceway that is provided around an inside surface of the outer ring, and an inner-ring raceway that is provided around an outside surface of the power roller; and the outer ring having a concave section provided on the outside surface thereof and supported by the trunnion so as to be able to pivotally displace by engaging the concave section with the cylindrical convex surface of the support beam; the concave section provided with a concave groove, which is a tapered groove having a wide opening and a narrow bottom, that is formed on the inner surface thereof and the cylindrical convex surface provided with a tapered protrusion having a wide base section and a narrow tip-end section that is formed in the circumferential direction around the support beam, and displacement of the outer ring in the axial direction of the support beam being restricted by engaging the concave groove with the tapered protrusion, wherein relief concave sections that are recessed in the radial direction are formed in portions on an outer-circumferential surface of the support beam that are located on both sides of the protrusion in the axial direction of the support beam, and a sealing material having elasticity is filled between the bottom surfaces of the relief concave sections and the inner-circumferential surface of the concave section.

* * * * *